(12) United States Patent
Hagano

(10) Patent No.: US 10,442,289 B2
(45) Date of Patent: Oct. 15, 2019

(54) OPENING/CLOSING APPARATUS FOR FUEL TANK

(71) Applicant: TOYODA GOSEI CO., LTD., Kiyosu-shi, Aichi-ken (JP)

(72) Inventor: Hiroyuki Hagano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 65 days.

(21) Appl. No.: 15/830,524

(22) Filed: Dec. 4, 2017

(65) Prior Publication Data

US 2018/0154766 A1 Jun. 7, 2018

(30) Foreign Application Priority Data

Dec. 5, 2016 (JP) ................. 2016-235601

(51) Int. Cl.
*B60K 15/04* (2006.01)
*B60K 15/03* (2006.01)
*B60K 15/035* (2006.01)
*B67D 7/04* (2010.01)

(52) U.S. Cl.
CPC .............. *B60K 15/04* (2013.01); *B60K 15/03* (2013.01); *B60K 15/03504* (2013.01); *B60K 15/0406* (2013.01); *B60K 2015/03493* (2013.01); *B60K 2015/03523* (2013.01); *B60K 2015/0429* (2013.01); *B60K 2015/0461* (2013.01); *B67D 7/04* (2013.01)

(58) Field of Classification Search
CPC ................ B60K 15/04; B60K 15/0406; B60K 15/03504; B60K 15/3523; B60K 2015/0429; B60K 2015/0445; B60K 2015/03523; B60K 2015/0419; B60K 2015/0422
See application file for complete search history.

(56) References Cited

U.S. PATENT DOCUMENTS

| | | | | |
|---|---|---|---|---|
| 4,715,509 A | * | 12/1987 | Ito .......................... | B60K 15/04 141/59 |
| 4,966,299 A | * | 10/1990 | Teets ...................... | B60K 15/04 123/516 |
| 6,637,477 B1 | * | 10/2003 | Maier .............. | B60K 15/03519 137/588 |

(Continued)

FOREIGN PATENT DOCUMENTS

JP 2014-069618 A 4/2014

*Primary Examiner* — Andrew D Stclair
(74) *Attorney, Agent, or Firm* — Posz Law Group, PLC

(57) ABSTRACT

An opening/closing apparatus for a fuel tank of a vehicle includes: a fuel passage forming portion forming a fuel passage guiding a liquid fuel to the fuel tank; an insertion-side opening/closing valve mechanism opening and closing a filler port of the fuel passage; a liquid discharge path allowing an internal region of the fuel passage forming portion to communicate with the outside through a liquid discharge port formed in a portion of the fuel passage forming portion, the portion closer to the fuel tank than the insertion-side opening/closing valve mechanism; an opening/closing valve mechanism opening and closing the liquid discharge port by a valve body; and a valve body regulating mechanism regulating the valve body to close the liquid discharge port when the insertion-side opening/closing valve mechanism opens the filler port.

3 Claims, 27 Drawing Sheets

(56) References Cited

U.S. PATENT DOCUMENTS

| | | | | |
|---|---|---|---|---|
| 6,708,724 | B2* | 3/2004 | Morinaga | B60K 15/03519 |
| | | | | 137/588 |
| 6,923,224 | B1* | 8/2005 | McClung | B60K 15/035 |
| | | | | 141/350 |
| 9,221,333 | B2* | 12/2015 | Hagano | B60K 15/04 |
| 9,908,401 | B2* | 3/2018 | Abe | F02M 25/0836 |
| 2014/0091095 | A1 | 4/2014 | Hagano et al. | |

* cited by examiner

OPENING/CLOSING APPARATUS FOR FUEL TANK

CROSS-REFERENCE TO RELATED APPLICATION(S)

This application is based upon and claims the benefit of priority from prior Japanese patent application No. 2016-235601, filed on Dec. 5, 2016, the entire contents of which are incorporated herein by reference.

BACKGROUND

The present invention relates to an opening/closing apparatus for a fuel tank.

In the related art, there is available an opening/closing apparatus for a fuel tank, which is opened when a liquid fuel is supplied from a fueling nozzle into a fuel tank of a vehicle, and which is closed when no liquid fuel is supplied. In such an opening/closing apparatus, it is required that the fuel overflowing from a fuel passage where the supplied liquid fuel passes is discharged to the outside, and that infiltration of dust from the outside is prevented. Therefore, there have been proposed various kinds of structures of a liquid discharge path in the related art (for example, see JP-A-2014-69618).

The liquid discharge path is connected to the fuel passage and the outside, thereby connecting the fuel passage and the outside. Accordingly, in the opening/closing apparatus for the fuel tank, the pressure inside the fuel passage is changed into a negative pressure with the passing of the liquid fuel in the fuel passage when the fuel is supplied, it is concerned that dust and the like is introduced into the opening/closing apparatus together with outside air from the outside.

SUMMARY

It is therefore an object of the invention to provide an opening/closing apparatus for a fuel tank of a vehicle which can solve at least some of the problems described above.

In order to achieve the object, according to an aspect of the invention, there is provided an opening/closing apparatus for a fuel tank of a vehicle, the opening/closing apparatus comprising: a fuel passage forming portion that forms a fuel passage configured to guide a supplied liquid fuel to the fuel tank; an insertion-side opening/closing valve mechanism that is disposed in the fuel passage forming portion, and that is configured to open and close a filler port of the fuel passage; a liquid discharge path that is configured to allow an internal region of the fuel passage forming portion to communicate with the outside of the opening/closing apparatus through a liquid discharge port formed in a portion of the fuel passage forming portion, the portion closer to the fuel tank than the insertion-side opening/closing valve mechanism; an opening/closing valve mechanism that is configured to open and close the liquid discharge port by a valve body disposed in the fuel passage forming portion; and a valve body regulating mechanism that is configured to regulate the valve body to close the liquid discharge port when the insertion-side opening/closing valve mechanism opens the filler port.

DETAILED DESCRIPTION OF EXEMPLARY EMBODIMENTS

Figure 1:
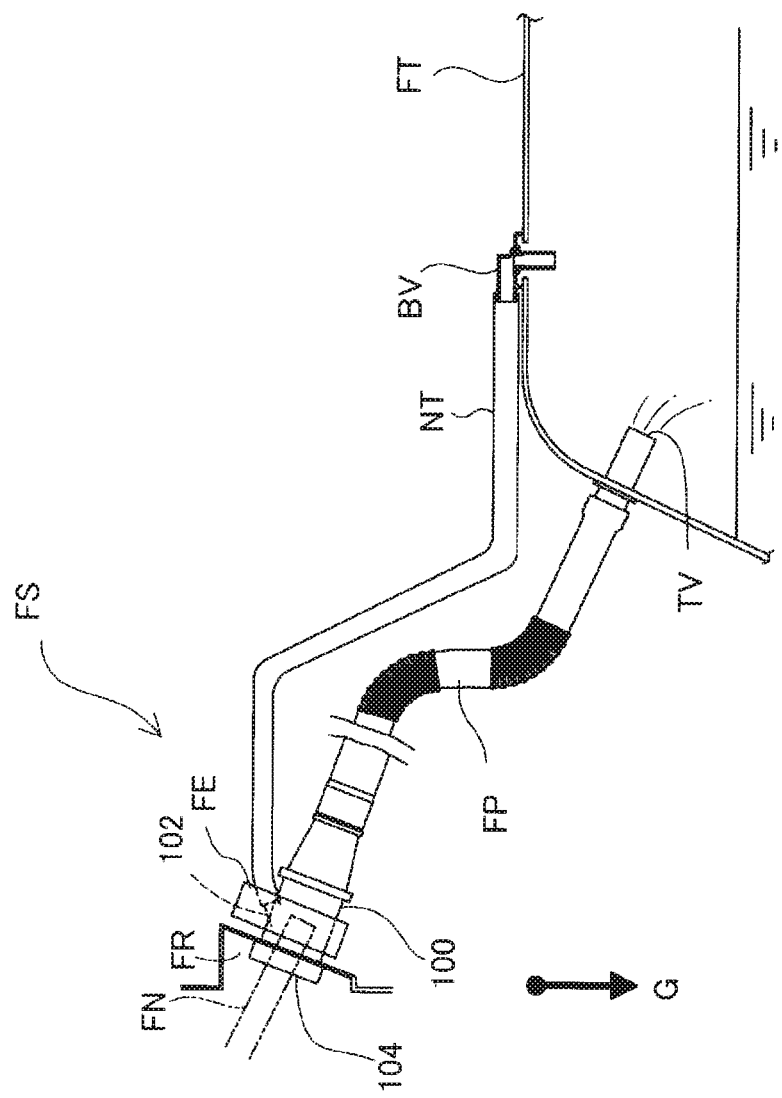
FIG. 1 is an explanatory view illustrating an outline of a fueling apparatus including an opening/closing apparatus for a fuel tank according to embodiments.

A. First Embodiment (A1) General Configuration of Opening/Closing Apparatus for Fuel Tank FIG. 1 is an explanatory view illustrating an outline of a fueling apparatus FS including an opening/closing apparatus for a fuel tank according to an embodiment. The fueling apparatus FS guides a fuel supplied from the fueling nozzle FN to a fuel tank FT of a vehicle. In each of the drawings subsequent to FIG. 1, an arrow G is illustrated to indicate a vertical direction. The fueling apparatus FS includes a filler neck 100, a fuel vapor port 102, a filler pipe FP, a check valve TV, a fuel vapor tube NT, a gas releasing valve BV, and a mounting member FE. The filler neck 100 is fixed to a fueling chamber FR of a vehicle by the mounting member FE, and receives the insertion of the fueling nozzle FN to the filler port 104. Using a disk-shaped base plate having a circular hole, into which a part of the filler neck 100 is inserted at a center, instead of the mounting member FE illustrated in the drawing, the filler neck 100 may be mounted to the fueling chamber FR.

The filler neck 100 is connected to the fuel tank FT through the filler pipe FP and the fuel vapor tube NT. Then, the filler neck 100 guides a liquid fuel such as gasoline from the fueling nozzle FN inserted into the filler port 104 to the fuel tank FT connected through the filler pipe FP. The filler pipe FP is, for example, a resin tube having a bellows structure at two places, and is extensible and bendable at a certain range. The filler pipe FP is connected to the fuel tank FT through the check valve TV. The fuel discharged from the fueling nozzle FN inserted into the filler port 104 is guided to the fuel tank FT from the check valve TV through a fuel passage (to be described below), which is formed by the filler neck 100, and the filler pipe FP. The check valve TV prevents backflow of the fuel from the fuel tank FT to the filler pipe FP.

One end of the fuel vapor tube NT is connected to the fuel tank FT through the gas releasing valve BV, and the other end thereof is connected to the fuel vapor port 102 protruding from the filler neck 100. The gas releasing valve BV functions as a joint for connecting the fuel vapor tube NT to the fuel tank FT. In-tank air containing fuel vapor flows into the fuel vapor tube NT from the gas releasing valve BV. The fuel vapor is guided to the fuel tank FT through the filler pipe FP together with the supplied fuel at the time of fueling from the fueling nozzle FN. The filler neck 100 will be described below in detail.

(A2) Configuration and Operation of Respective Portions of Filler Neck

Figure 2:
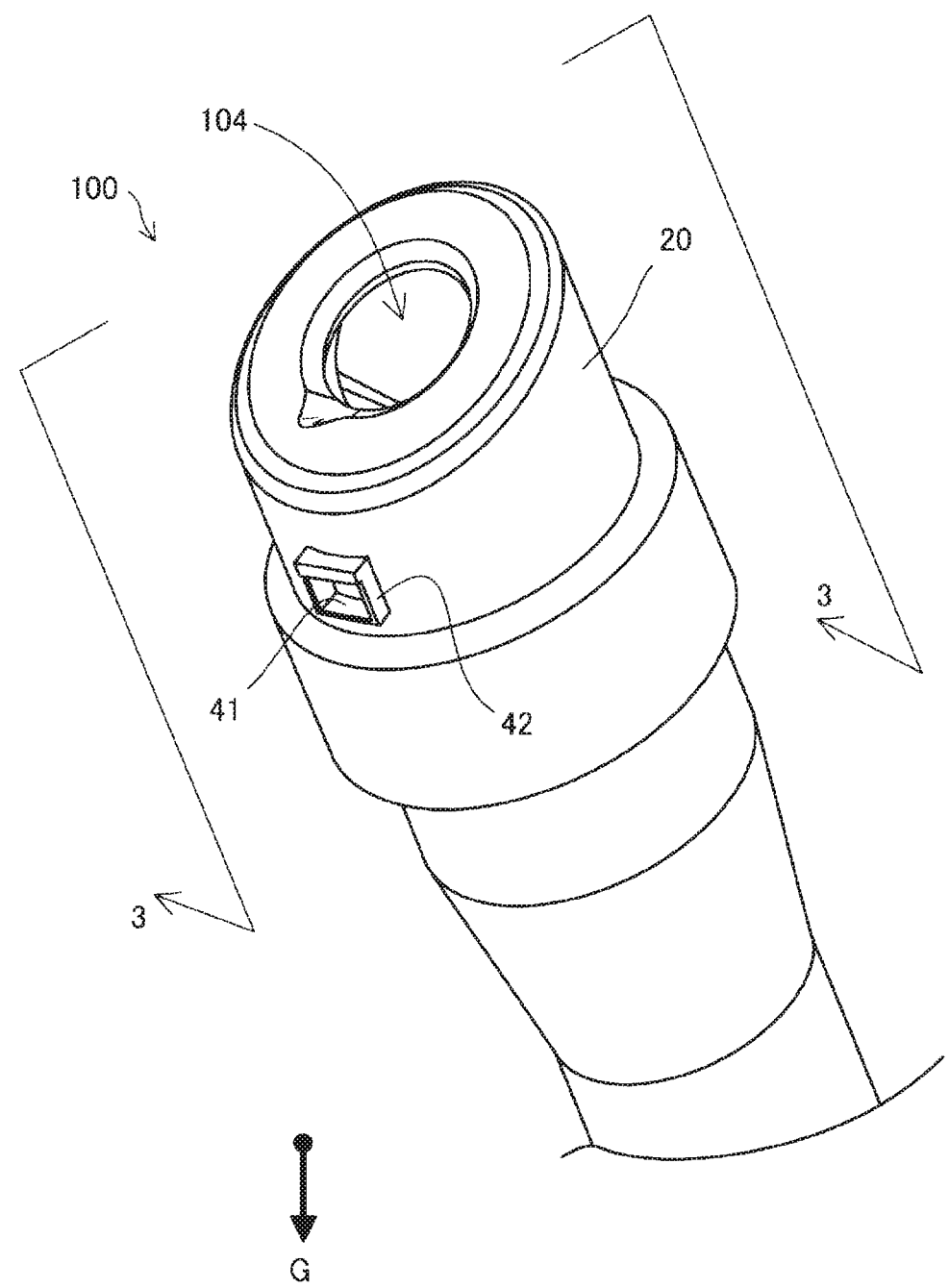
FIG. 2 is a perspective view schematically illustrating a filler neck functioning as an opening/closing apparatus for a fuel tank of a first embodiment.
Figure 3:
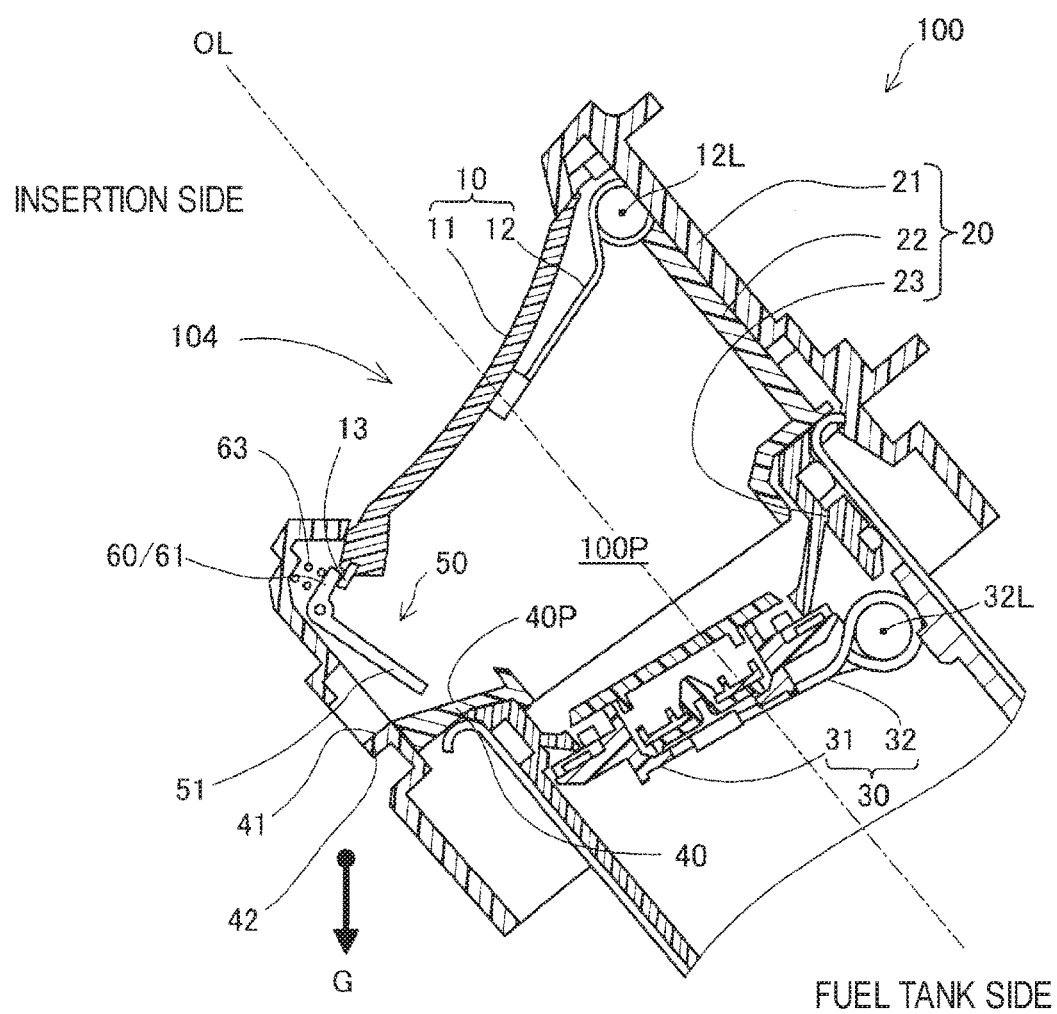
FIG. 3 is a sectional view taken along line 3-3 in FIG. 2 for explaining main portions of the filler neck.
Figure 4:
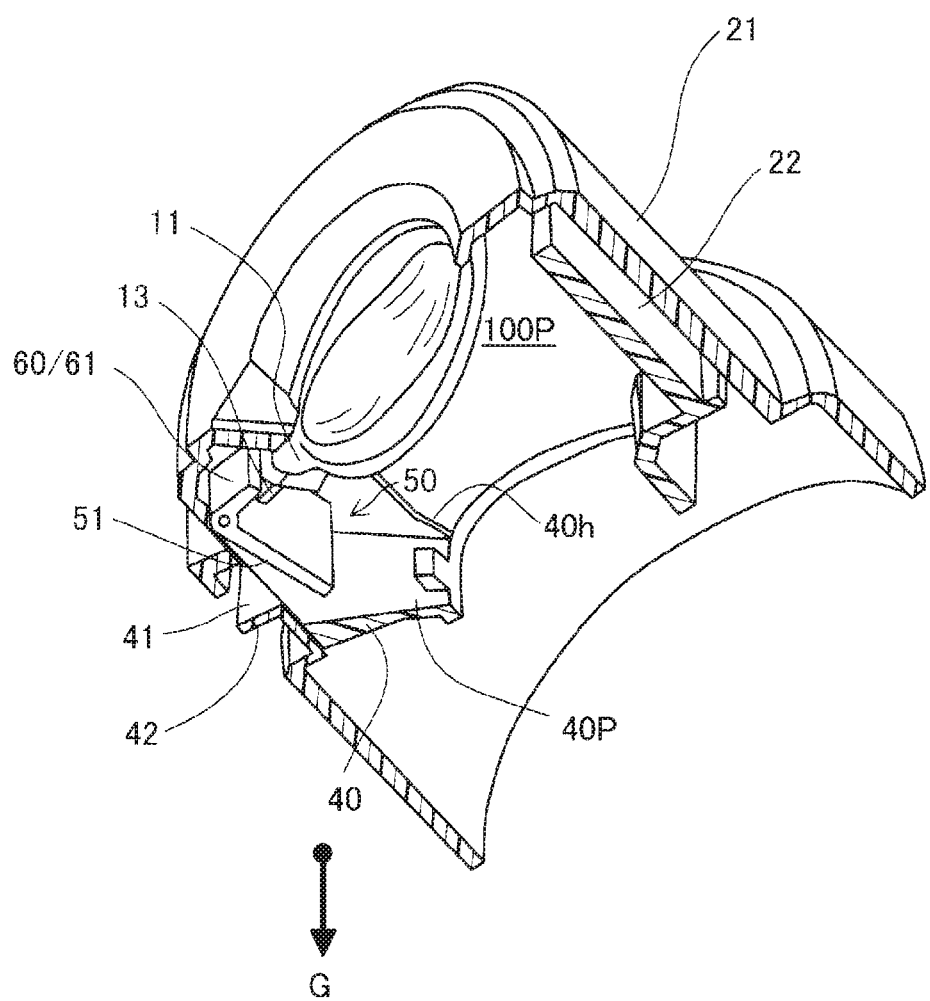
FIG. 4 is an explanatory perspective view illustrating main portions of the filler neck when viewed from the cross section.

FIG. 2 is a perspective view schematically illustrating the filler neck 100 functioning as the opening/closing apparatus for the fuel tank of the first embodiment. FIG. 3 is a sectional view taken along line 3-3 in FIG. 2 for explaining main portions of the filler neck 100. FIG. 4 is an explanatory perspective view illustrating main portions of the filler neck 100 when viewed from the cross section. In the following description, a side closer to the fuel tank rather than the filler port 104 is referred as "fuel tank side" as appropriate, and a side closer to the filler port 104 rather than the fuel tank is referred to as "insertion side" as appropriate. In order to clearly illustrate constituent members in FIG. 3, each of the constituent members is illustrated as end face in a cross section.

As illustrated in FIG. 3, the filler neck 100 includes a fuel passage forming portion 20 configured to form a fuel passage 100P, an insertion-side opening/closing valve mechanism 10, a fuel tank-side opening/closing valve mechanism 30, a liquid discharge path forming portion 40, an opening/closing valve mechanism 50, and valve body regulating mechanism 60. The fuel passage forming portion 20 has a cylindrical shape and includes an outer body 21 configured to form the filler port 104, an inner body 22 surrounding the fuel passage 100P at the insertion side, and an under body 23 incorporated with the fuel tank-side opening/closing valve mechanism 30 at the fuel tank side. The fuel passage 100P is surrounded by each of the bodies described above, and guides a liquid fuel supplied from the filler port 104 to the fuel tank side along an axis OL.

The insertion-side opening/closing valve mechanism 10 is disposed in the outer body 21 of the fuel passage forming portion 20, and opens and closes the filler port 104 of the fuel passage 100P. That is, the insertion-side opening/closing valve mechanism 10 opens the filler port 104 as the fueling nozzle FN (see FIG. 1) is inserted into the filler port 104, and closes the filler port 104 in a state where the fueling nozzle FN is not inserted. The insertion-side opening/closing valve mechanism 10 includes an insertion-side opening/closing member 11 which opens and closes the filler port 104 and an insertion-side spring 12 which is fixed to the fuel passage forming portion 20 to urge the insertion-side opening/closing member 11 in a closing direction. The insertion-side opening/closing member 11 is formed in a disk shape in which a central part is recessed toward the fuel tank side. The insertion-side spring 12 is fixed to the fuel passage forming portion 20 at a fixing end 12L, and is fixed to the insertion-side opening/closing member 11 at a free end opposite to the fixing end 12L. The insertion-side spring 12 pivots about the fixing end 12L in a range of a predetermined angle and urges the insertion-side opening/closing member 11 in a direction in which the filler port 104 of the fuel passage 100P is closed. The insertion-side spring 12 is disposed such that the fixing end 12L is located above the free end in a direction of gravity in the state where the insertion-side opening/closing valve mechanism 10 is closed when the filler neck 100 is mounted on the vehicle. In other words, the insertion-side spring 12 is disposed above the axis OL in the direction of gravity. In the course of insertion of the fueling nozzle FN, when the fueling nozzle FN comes in contact with insertion-side opening/closing member 11 and a stronger force than the urging force of the insertion-side spring 12 is applied to the fuel tank side, the insertion-side opening/closing member 11 rotates about the fixing end 12L toward the fuel tank side, whereby the insertion-side opening/closing valve mechanism 10 opens the filler port 104.

The fuel tank-side opening/closing valve mechanism 30 is disposed on the under body 23 of the fuel passage forming portion 20 on the fuel tank side rather than the insertion-side opening/closing valve mechanism 10 and opens and closes the fuel passage 100P. The fuel tank-side opening/closing valve mechanism 30 includes a fuel tank-side opening/closing member 31 configured to open and close the fuel passage 100P and a fuel tank-side spring 32 fixed to the fuel passage forming portion 20 and configured to urge the fuel tank-side opening/closing member 31 in the closing direction. The fuel tank-side opening/closing member 31 is a flap valve configured to prevent the backflow of the liquid fuel from the fuel tank side toward the insertion side. The fuel tank-side spring 32 is fixed to the fuel passage forming portion 20 at a fixing end 32L, and is fixed to the fuel tank-side opening/closing member 31 at a free end opposite to the fixing end 12L. The fuel tank-side spring 32 pivots about the fixing end 32L in a range of a predetermined angle to urge the fuel tank-side opening/closing member 31 in the closing direction of the fuel passage 100P. The fuel tank-side spring 32 is disposed such that the fixing end 12L is located above the free end in the direction of gravity in the state where the fuel tank-side opening/closing valve mechanism 30 is closed when the filler neck 100 is mounted on the vehicle. In other words, the fuel tank-side spring 32 is disposed above the axis OL in the direction of gravity, similarly to the insertion-side spring 12 of the insertion-side opening/closing valve mechanism 10.

The opening/closing valve mechanism 50 opens and closes the liquid discharge port 41 of the liquid discharge path 40P by a valve body 51 disposed inside the fuel passage forming portion 20, specifically, on an inner wall of the inner body 22. The liquid discharge path 40P is formed by the liquid discharge path forming portion 40 occupying a part of the inner body 22, and allows an internal region of the fuel passage forming portion 20, specifically, an internal region between the outer body 21 and the inner body 22 to communicate with the outside of the filler neck 100 through the liquid discharge port 41. In other words, the liquid discharge path 40P is a flow path branched from the fuel passage 100P which is closer to the fuel tank side than the insertion-side opening/closing valve mechanism 10 and is located on the insertion side of the fuel tank-side opening/closing valve mechanism 30. The liquid discharge port 41 is formed in the outer body 21 of the fuel passage forming portion 20 between the insertion-side opening/closing valve mechanism 10 and the fuel tank-side opening/closing valve mechanism 30, and is surrounded by a partition wall 42 at the outer wall of the body.

The liquid discharge path forming portion 40 is formed such that the liquid discharge path 40P reaching the liquid discharge port 41 faces a shielding wall 40h (see FIG. 4) for incorporating the valve body 51 included in the opening/closing valve mechanism 50 to be described below. The liquid discharge path forming portion 40 is disposed below the fuel passage forming portion 20 in the direction of gravity when the filler neck 100 is mounted on the vehicle. In other words, according to the embodiment, the liquid discharge path forming portion 40 and the liquid discharge path 40P are disposed on the lower side of the axis OL when the filler neck 100 is slantingly fixed to the vehicle as illustrated in FIG. 3, and the liquid discharge port 41 is located at a vertically lower side than the fuel passage 100P. In addition, the liquid discharge path forming portion 40 and the liquid discharge path 40P are disposed on a side opposite to the fixing end 12L of the insertion-side spring 12 and the fixing end 32L of the fuel tank-side spring 32 with the axis OL as a center.

Figure 5:
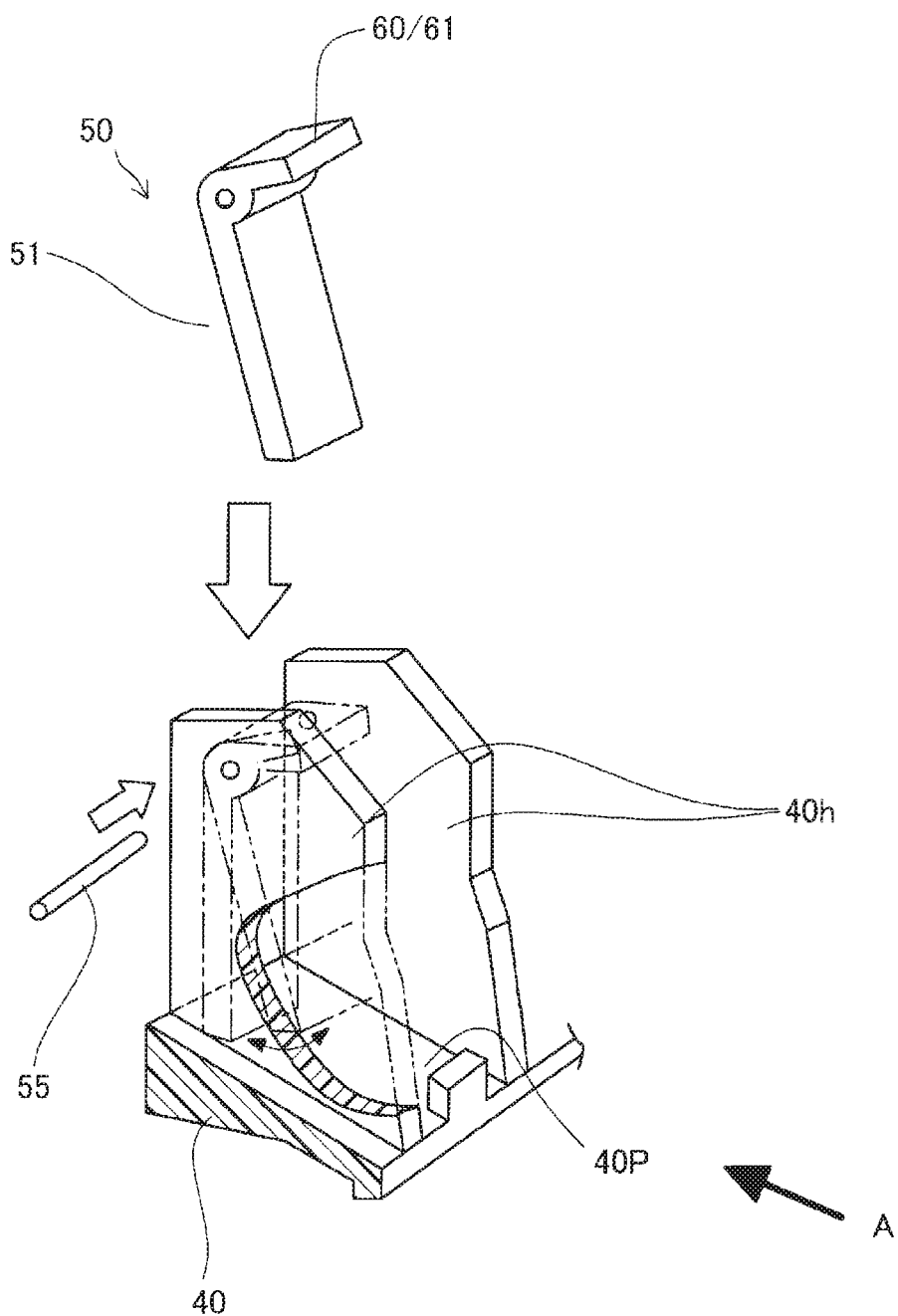
FIG. 5 is an explanatory view illustrating constituent members of an opening/closing valve mechanism and an assembling state thereof together with a valve body regulating mechanism.
Figure 6:
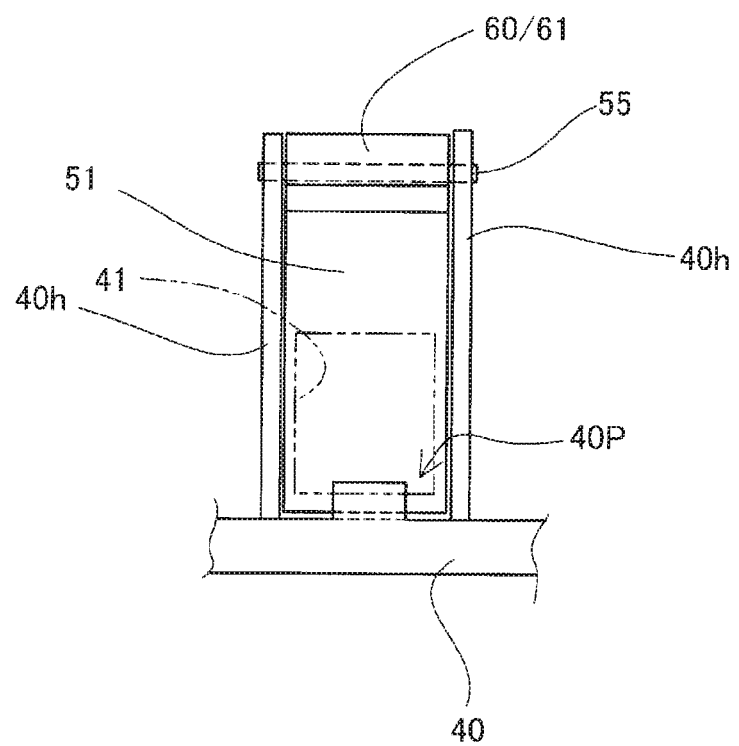
FIG. 6 is an explanatory front view illustrating the opening/closing valve mechanism as viewed in a direction "A" in FIG. 5.

The opening/closing valve mechanism 50 includes the valve body 51 that opens and closes the liquid discharge port 41 in the liquid discharge path 40P. The valve body regulating mechanism 60 includes a first engaging portion 61 and a spring 63 so as to regulate the movement of the valve body 51. FIG. 5 is an explanatory view illustrating constituent members of the opening/closing valve mechanism 50 and an assembling state thereof together with the valve body regulating mechanism 60. FIG. 6 is an explanatory front view illustrating the opening/closing valve mechanism 50 as viewed in a direction "A" in FIG. 5. In the embodiment, since the valve body regulating mechanism 60 is defined as the first engaging portion 61 which is a portion protruding from the valve body 51, reference numerals of the valve body regulating mechanism 60 and the first engaging portion 61 are described in parallel from FIG. 3 to FIG. 9 to be described below.

As illustrated in FIG. 5, the liquid discharge path forming portion 40 partitions both sides of the liquid discharge path 40P with the shielding wall 40h protruding from an upper surface of the liquid discharge path forming portion. The liquid discharge path 40P partitioned in this way allows the internal region of the fuel passage forming portion 20 to communicate with the outside of the filler neck 100 through the liquid discharge port 41 as described above. Then, the opening/closing valve mechanism 50 is assembled with the valve body 51 inserted between the shielding walls 40h. In this assembled state, the valve body 51 is pivotably supported on the shielding wall 40h by a pivot support pin 55, and in the valve body regulating mechanism 60, the protruding portion protruding toward the insertion-side opening/closing member 11 (see FIG. 4) from the valve body 51 is defined as the first engaging portion 61 to be engaged with the insertion-side opening/closing member 11, specifically, with an engaging piece 13 of the insertion-side opening/closing member 11. Therefore, the valve body 51 of the opening/closing valve mechanism 50 and the first engaging portion 61 of the valve body regulating mechanism 60 are pivotable integrally around the pivot support pin 55. That is, the opening/closing valve mechanism 50 opens and closes the liquid discharge port 41 by the rotatable movement of the valve body 51 around the pivot support pin 55. The valve body regulating mechanism 60 causes the first engaging portion 61 to be engaged with the engaging piece 13 (see FIG. 4) of the insertion-side opening/closing member 11 by pivoting around the pivot support pin 55. When the valve body 51 and the valve body regulating mechanism 60 are incorporated, the spring 63 illustrated in FIG. 3 is incorporated in the outer body 21 of the fuel passage forming portion 20 to urge the first engaging portion 61 of the valve body regulating mechanism 60 toward the engaging piece 13 of the insertion-side opening/closing member 11. The relation between the urging force of the spring 63 and the opening/closing state of the liquid discharge port 41 due to the valve body 51 will be described below including the relation with own weight 51G of the valve body 51.

(A3) Operational Effects of Opening/Closing Valve Mechanism 50

Figure 7:
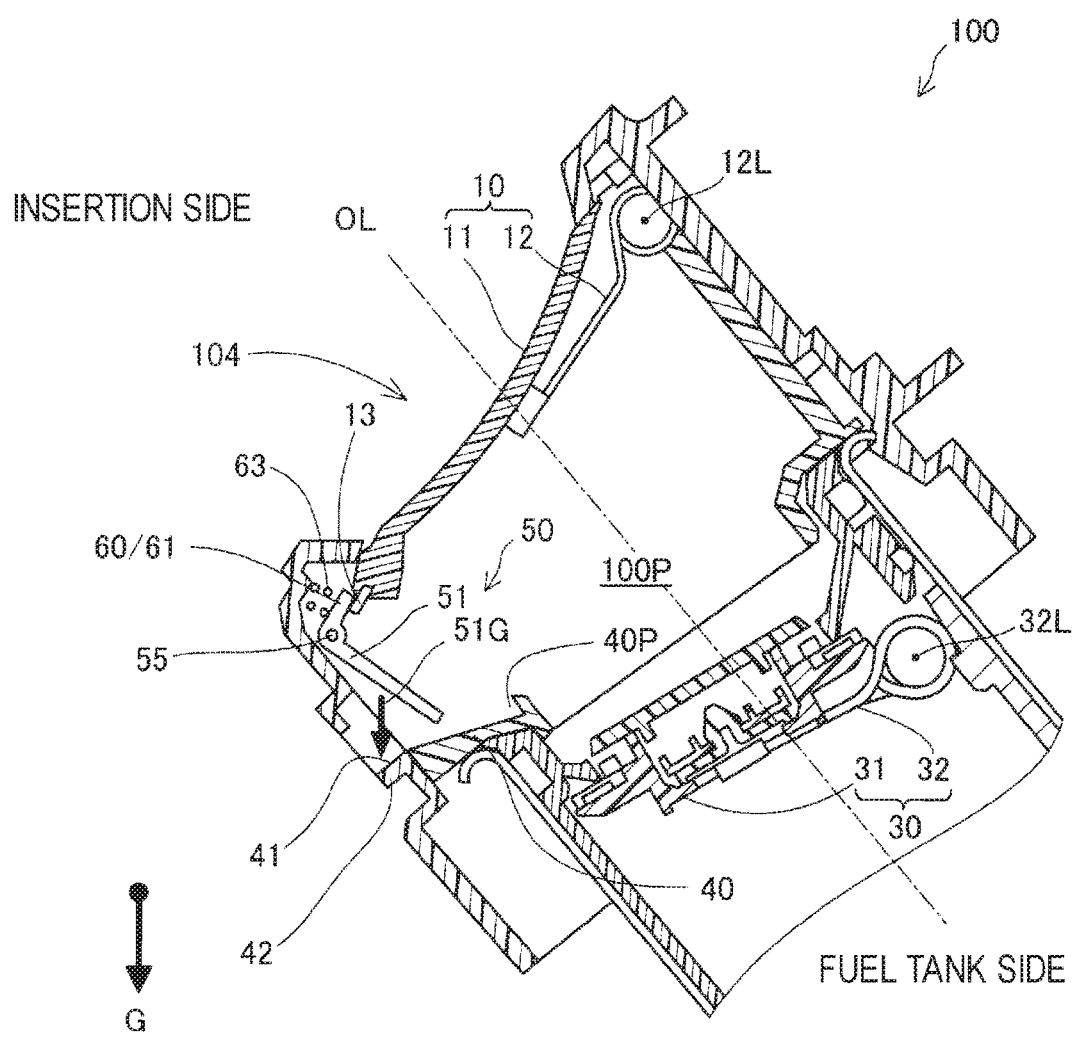
FIG. 7 is an explanatory view illustrating how a liquid discharge port is closed by the opening/closing valve mechanism and how a valve body is regulated by the valve body regulating mechanism when a vehicle is in a stopped state.
Figure 8:
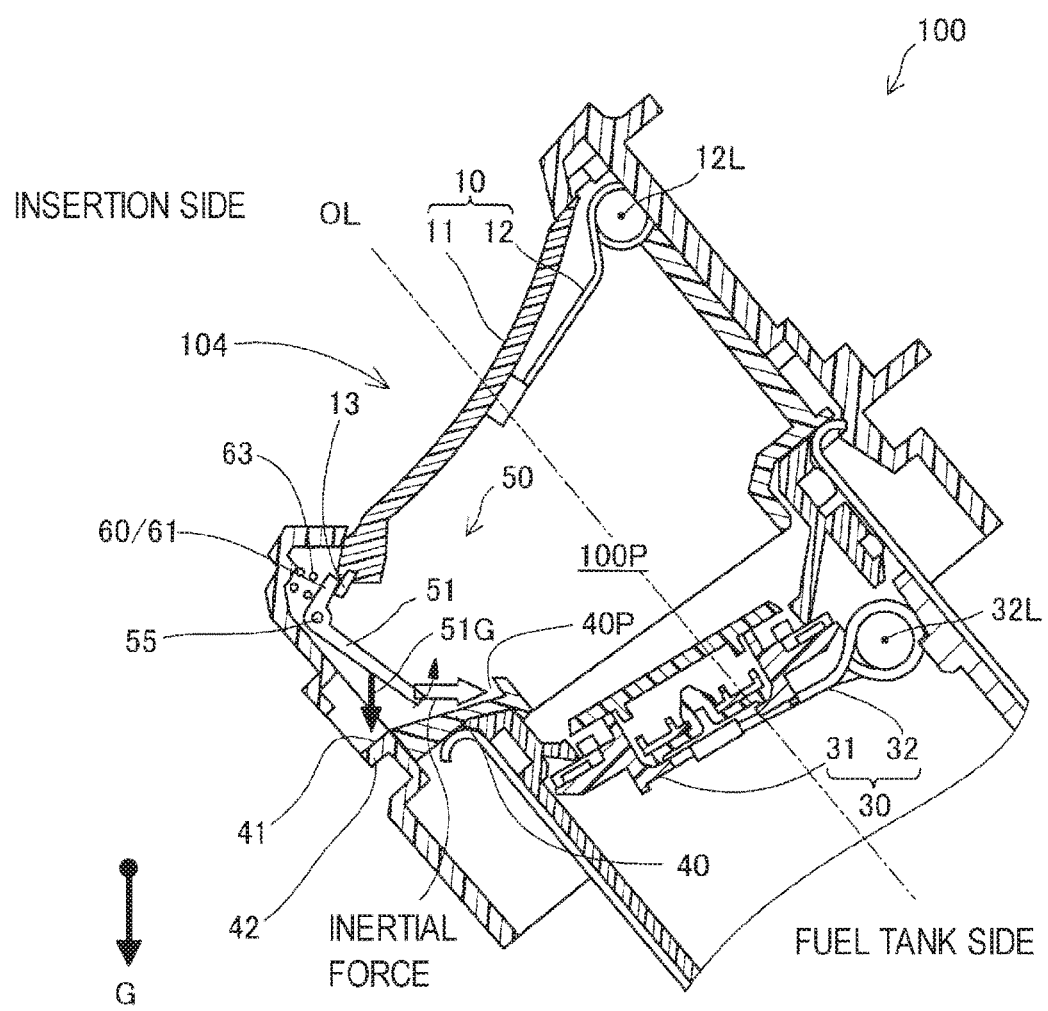
FIG. 8 is an explanatory view illustrating how the liquid discharge port is opened by the opening/closing valve mechanism and how the valve body is regulated by the valve body regulating mechanism when the vehicle is traveling from the stopped state.

FIG. 7 is an explanatory view illustrating how the liquid discharge port is closed by the opening/closing valve mechanism 50 and how the valve body is regulated by the body regulating mechanism 60 when the vehicle is in a stopped state. FIG. 8 is an explanatory view illustrating how the liquid discharge port 41 is opened by the opening/closing valve mechanism 50 and how the valve body 51 is regulated by the valve body regulating mechanism 60 when the vehicle is traveling from the stopped state.

In the stopped state of the vehicle, since the insertion-side opening/closing valve mechanism 10 closes the filler port 104 with the insertion-side opening/closing member 11, the first engaging portion 61 of the valve body regulating mechanism 60 is engaged with the engaging piece 13. The spring 63 exerts the urging force through the first engaging portion 61 so that the valve body 51 pivots to be closed. However, the urging force of the spring 63 is not involved in the pivoting of the valve body 51 by the engagement between the engaging piece 13 and the first engaging portion 61, and the valve body 51 brings the liquid discharge port 41 into an open state in a posture in which the first engaging portion 61 is engaged with the engaging piece 13. Although the own weight 51G of the valve body 51 extends in the vertical direction, the valve body 51 brings the liquid discharge port 41 into the open state due to the engagement between the engaging piece 13 and the first engaging portion 61. That is, in the state where the valve body 51 opens the liquid discharge port 41 in this manner, the first engaging portion 61 is engaged with the engaging piece 13 of the insertion-side opening/closing member 11.

When the vehicle is traveling from the stopped state, as indicated by a void arrow in FIG. 8, an inertial force accompanying the vehicle traveling, for example, a centrifugal force acting at the time of vehicle turning or an inertial force such as an acceleration force at the time of rapid acceleration and deceleration acts on the valve body 51. When the inertial force is higher than the own weight 51G of the valve body 51 and the urging force of the spring 63, the valve body 51 pivots around the axis of the pivot support pin 55, thereby further opening the liquid discharge port 41.

Figure 9:
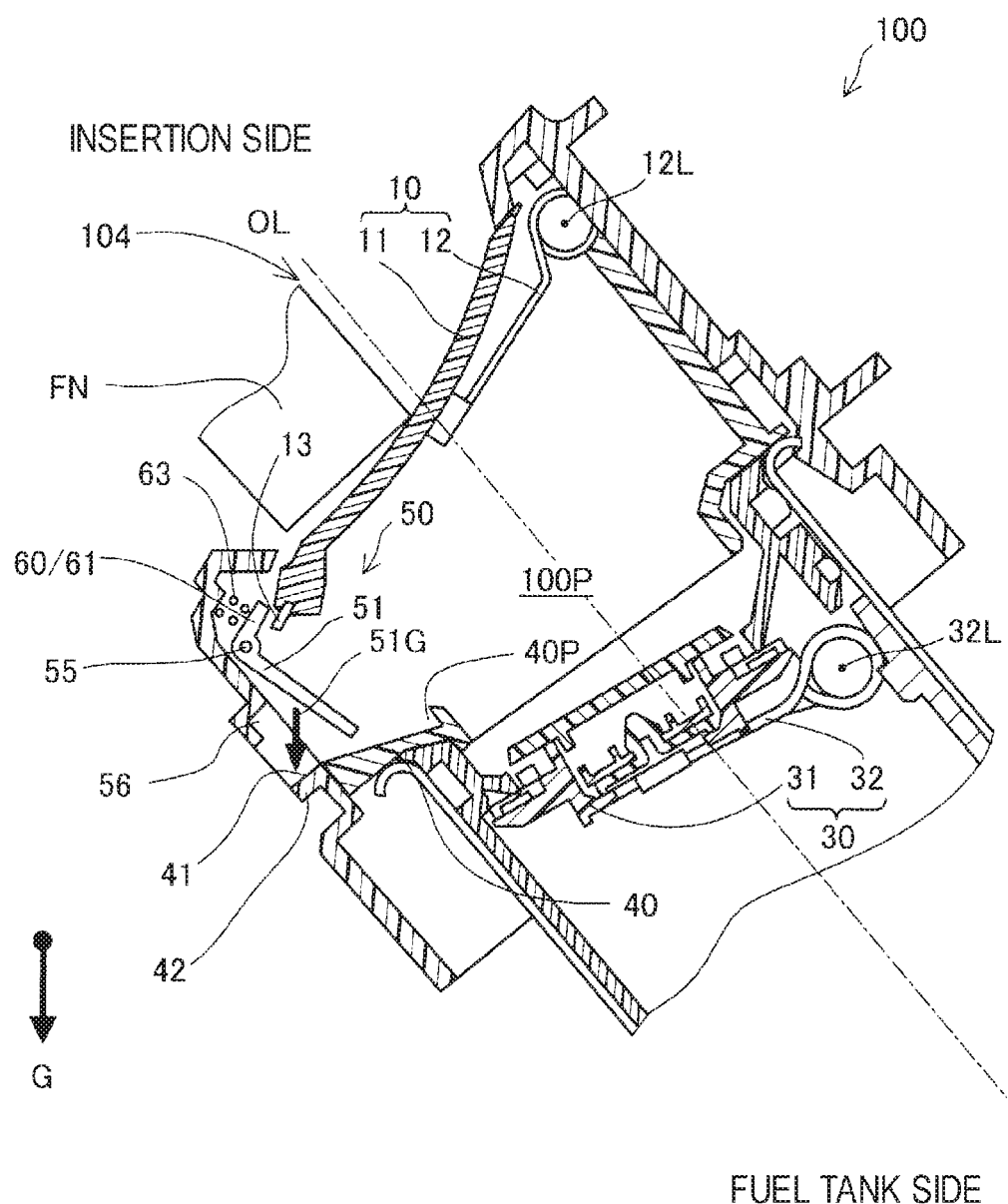
FIG. 9 is an explanatory view illustrating how the liquid discharge port is closed by the opening/closing valve mechanism and how the valve body is regulated by the valve body regulating mechanism before fueling.
Figure 10:
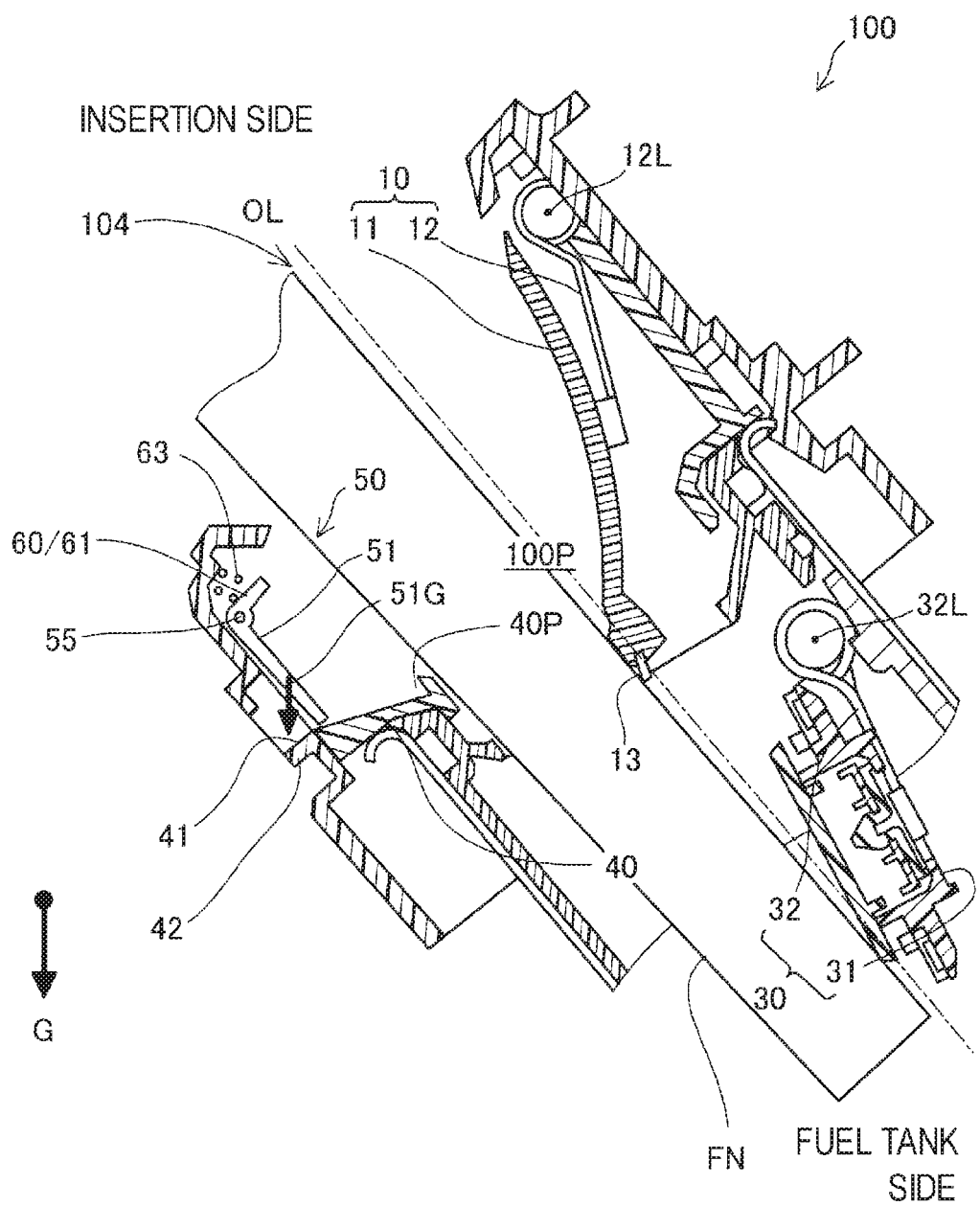
FIG. 10 is an explanatory view illustrating how the valve body is regulated by the valve body regulating mechanism during fueling.

FIG. 9 is an explanatory view illustrating how the liquid discharge port is closed by the opening/closing valve mechanism 50 and how the valve body is regulated by the valve body regulating mechanism 60 before fueling. FIG. 10 is an explanatory view illustrating how the valve body 51 is regulated by the valve body regulating mechanism 60 during fueling.

Before the fueling, the vehicle is in a stopped state and the engaging piece 13 of the insertion-side opening/closing member 11 is engaged with the first engaging portion 61. Therefore, as described above, the valve body 51 opens the liquid discharge port 41. Then, as illustrated in FIG. 9, since the fueling nozzle FN is inserted from the filler port 104 as the fueling is performed, the insertion-side opening/closing member 11 of the insertion-side opening/closing valve mechanism 10 is driven to open the filler port 104 by the fueling nozzle FN, and the engagement between the engaging piece 13 of the insertion-side opening/closing member 11 and the first engaging portion 61 of the valve body regulating mechanism 60 is released. When the fueling nozzle FN is further inserted, as illustrated in FIG. 10, the insertion-side opening/closing member 11 of the insertion-side opening/closing valve mechanism 10 is further driven to open the filler port 104, and then the fuel tank-side opening/closing member 31 of the fuel tank-side opening/closing valve mechanism 30 is also driven to the opening side. Thus, when the insertion-side opening/closing member 11 opens the filler port 104, the engagement between the engaging piece 13 of the insertion-side opening/closing member 11 and the first engaging portion 61 of the valve body regulating mechanism 60 is released. Accordingly, the valve body regulating mechanism 60 exerts the urging force of the spring 63 through the first engaging portion 61 which is disengaged from the engaging piece 13, so that the valve body 51 pivots to be closed. Moreover, the valve body 51 pivots to be closed by its own weight 51G. As a result, in a state where the insertion-side opening/closing member 11 opens the filler port 104 according to the fueling through the fueling nozzle FN, the valve body 51 of the opening/closing valve mechanism 50 receives the own weight 51G of the valve body 51 and the urging force of the spring 63 in the valve body regulating mechanism 60 to close the liquid discharge port 41. At this time, the urging force of the spring 63 in the valve body regulating mechanism 60 acts so as to regulate the valve body 51 to close the liquid discharge port 41.

In the filler neck 100 functioning as the opening/closing apparatus for the fuel tank according to the embodiment as described above, during the fuel supply that the insertion-side opening/closing member 11 of the insertion-side opening/closing valve mechanism 10 opens the filler port 104 according to the insertion of the fueling nozzle FN, the valve body 51 of the opening/closing valve mechanism 50 is regulated to close the liquid discharge port 41 and the closing of the liquid discharge port 41 is maintained by the valve body 51. Therefore, according to the filler neck 100 of the embodiment, the liquid discharge port 41 is closed during the fuel supply, and thus it is possible to suppress introduction of outside air from the liquid discharge path 40P into not only the internal region of the fuel passage forming portion 20 but also the fuel passage 100P.

In the filler neck 100 according to the embodiment, the valve body regulating mechanism 60 includes the first engaging portion 61 engaged with the engaging piece 13 of the insertion-side opening/closing member 11, the valve body regulating mechanism 60 regulating the valve body 51 to close the liquid discharge port 41 when the insertion-side opening/closing valve mechanism 10 opens the filler port 104. The first engaging portion 61 is defined as the protruding portion protruding toward the insertion-side opening/closing member 11 from the valve body 51. Moreover, when the insertion-side opening/closing member 11 opens the filler port 104, the urging force for urging the valve body 51 to close the liquid discharge port 41 is exerted from the spring to the first engaging portion 61 which is disengaged from the engaging piece 13 of the insertion-side opening/closing member 11. Therefore, according to the filler neck 100 of the embodiment, it is possible to simplify the structure by sharing the constituent members with the opening/closing valve mechanism 50 and the valve body regulating mechanism 60, and to suppress the introduction of the outside air toward the fuel passage 100P while maintaining the closure of the liquid discharge port 41 during the fuel supply.

In the filler neck 100 according to the embodiment, when the vehicle is traveling from the stopped state, as illustrated in FIG. 8, the inertial force accompanying the vehicle traveling acts on the valve body 51 of the opening/closing valve mechanism 50, whereby the valve body 51 further opens the liquid discharge port 41. Thereby, if water is stored in the internal region of the fuel passage forming portion 20, this stored water can be discharged from the liquid discharge path 40P to the outside of the filler neck 100 in the traveling state of the vehicle.

Figure 11:
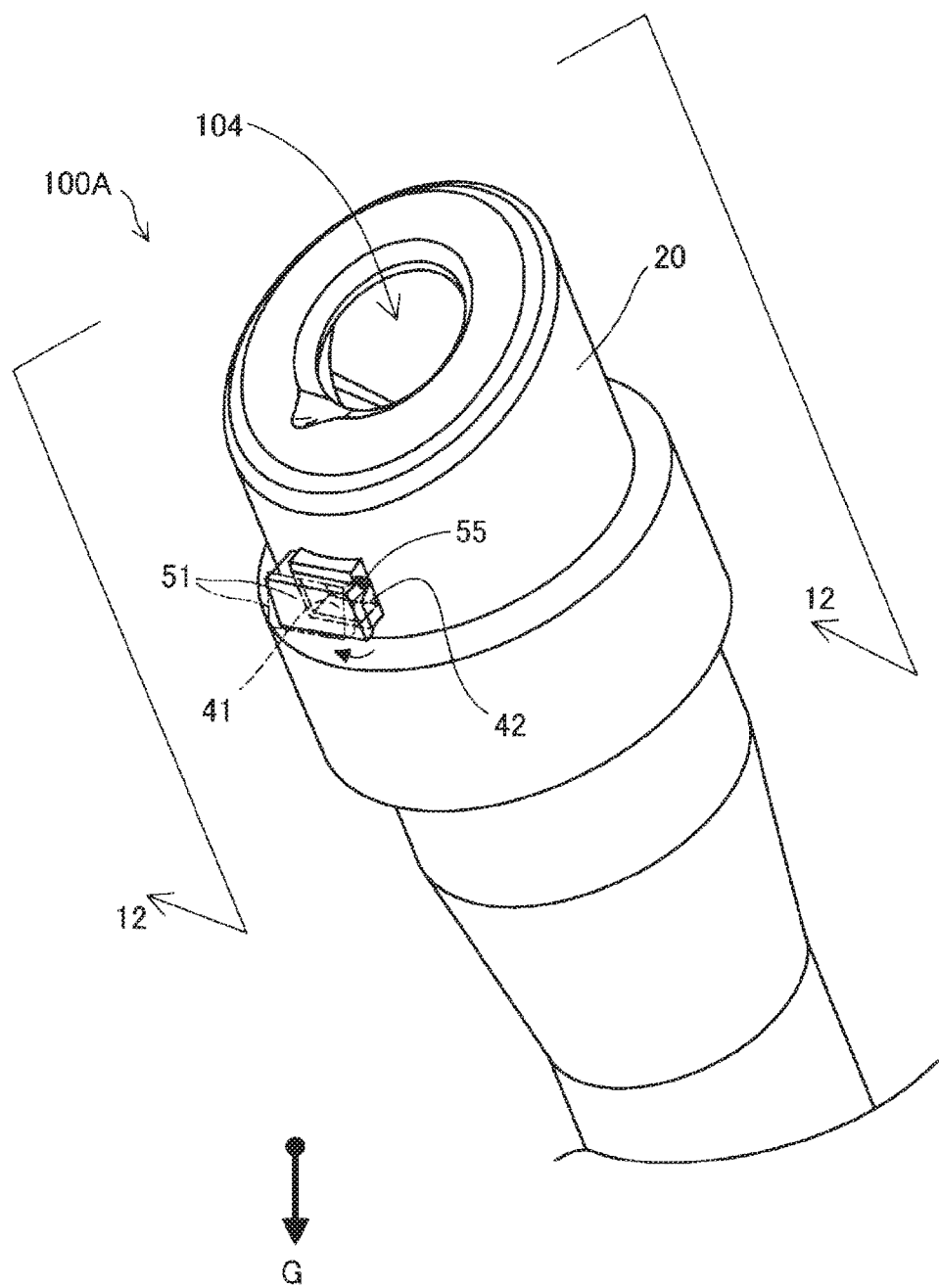
FIG. 11 is a perspective view schematically illustrating a filler neck according to a second embodiment.
Figure 12:
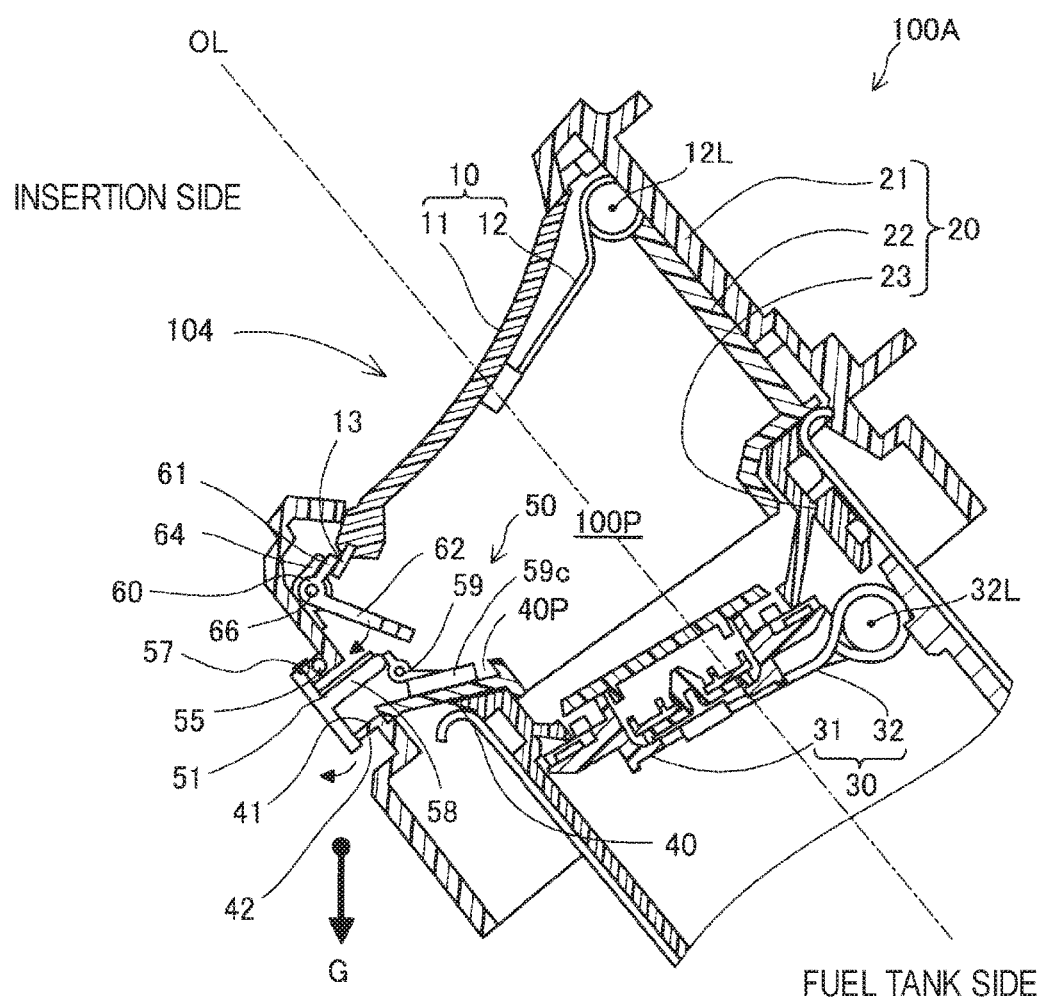
FIG. 12 is a sectional view taken along line 12-12 in FIG. 11 for explaining main portions of the filler neck.
Figure 13:
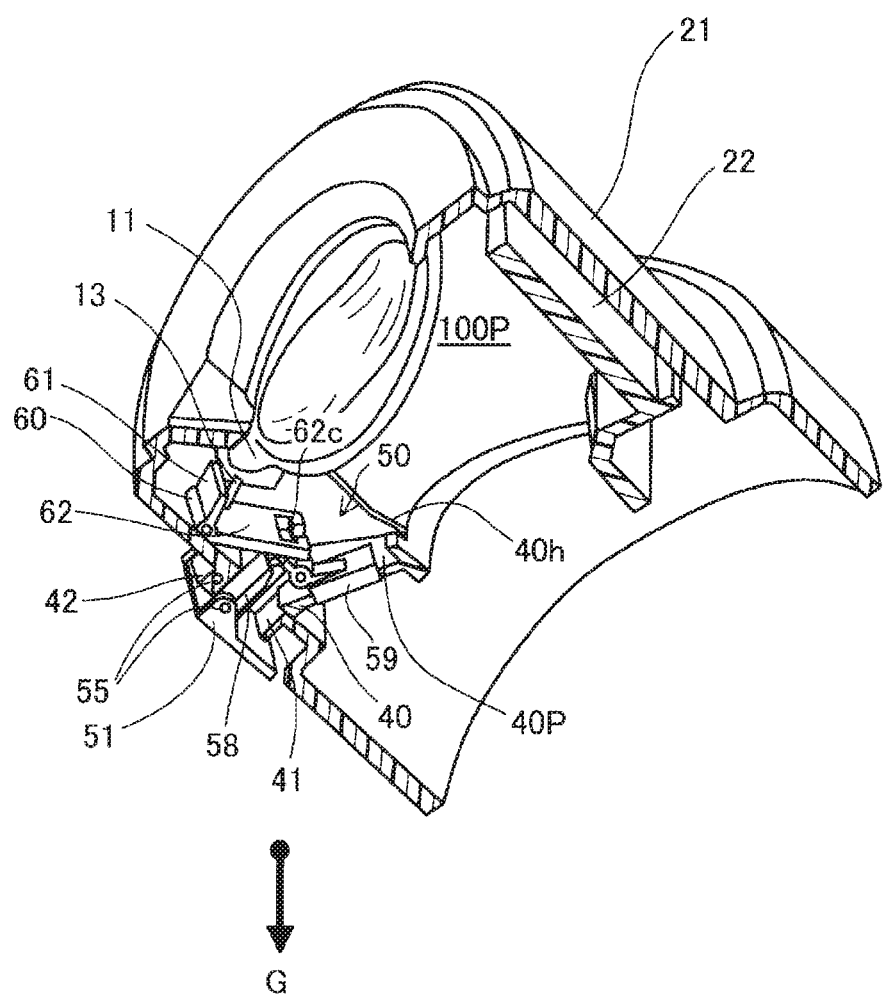
FIG. 13 is an explanatory perspective view illustrating main portions of the filler neck when viewed from the cross section.

B. Second Embodiment (B1) Configuration and Operation of Respective Portions of Filler Neck FIG. 11 is a perspective view schematically illustrating a filler neck 100A according to a second embodiment. FIG. 12 is a sectional view taken along line 12-12 in FIG. 11 for explaining main portions of the filler neck 100A. FIG. 13 is an explanatory perspective view illustrating main portions of the filler neck 100A when viewed from the cross section. The filler neck 100A according to the second embodiment differs from the filler neck 100 according to the first embodiment in that the valve body 51 of the opening/closing valve mechanism 50 is provided on the outer wall of the outer body 21 of the fuel passage forming portion 20 and the regulation of the valve body 51 is performed inside the outer body 21. Hereinafter, the filler neck 100A according to the second embodiment will mainly be described in detail in terms of the differences. In the following description, the same members in the function as the first embodiment will be described with the same reference numerals even if there is a difference in shape or the like.

Figure 14:
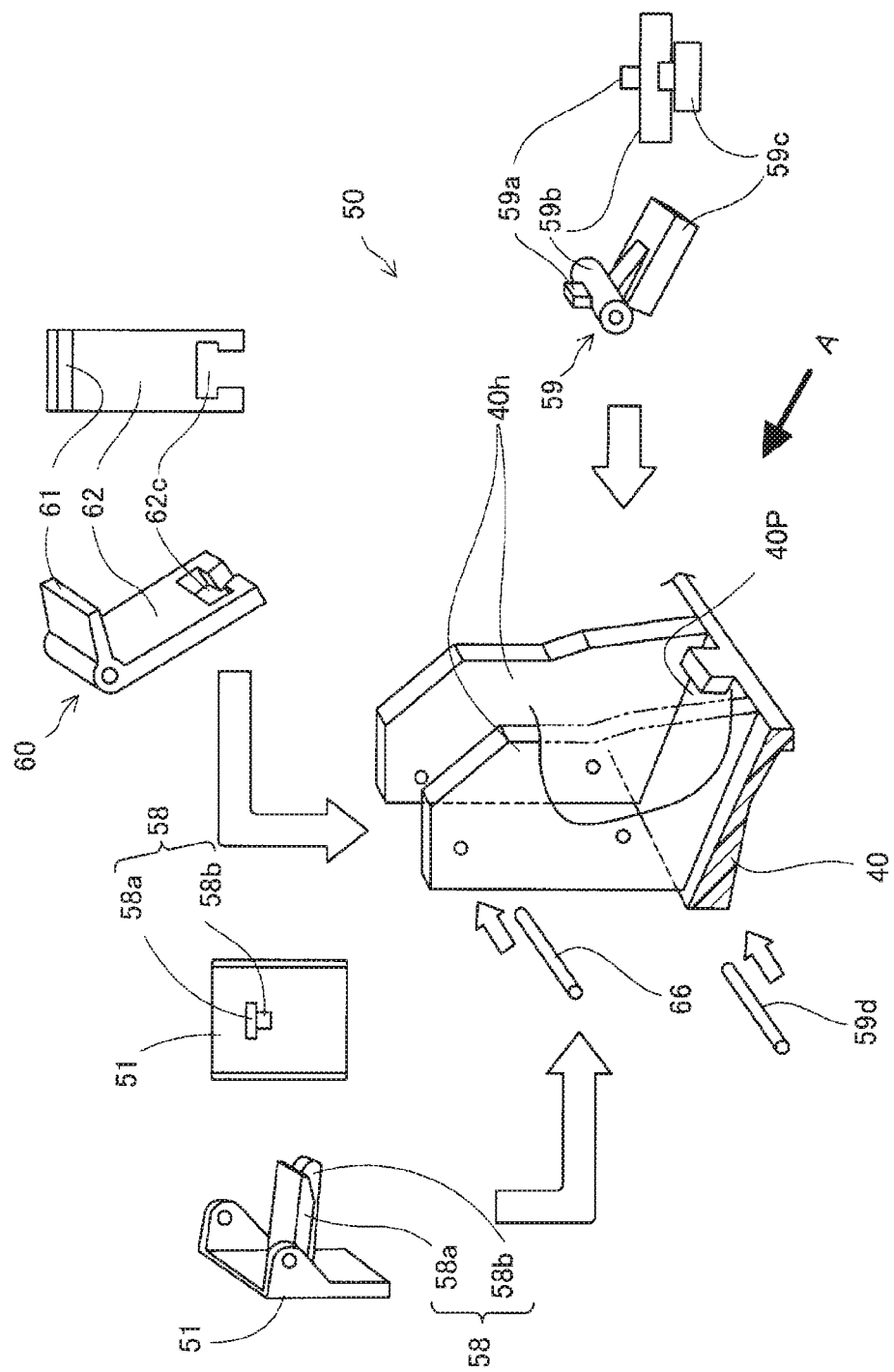
FIG. 14 is an explanatory view illustrating constituent members of the opening/closing valve mechanism and an assembling state thereof together with the valve body regulating mechanism.
Figure 15:
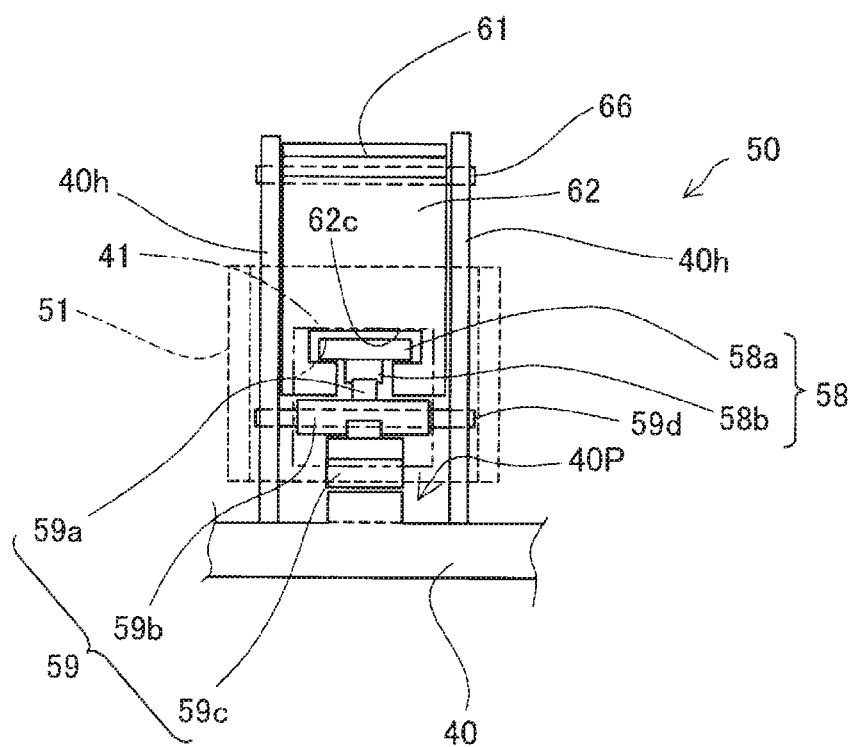
FIG. 15 is an explanatory front view illustrating the opening/closing valve mechanism as viewed in a direction "A" in FIG. 14.

As illustrated in FIG. 11, the valve body 51 is disposed on the partition wall 42 surrounding the liquid discharge port 41, and opens and closes the liquid discharge port 41 on the outer wall of the fuel passage forming portion 20. As illustrated in FIG. 12, the valve body 51 is pivotably supported on the partition wall 42 by the pivot support pin 55, and a bent leaf spring body 57 is disposed across the valve body 51 and the partition wall 42 at an upper end thereof. Since the bent leaf spring body 57 exerts an urging force on the side of the valve body 51 for closing the liquid discharge port 41, the valve body 51 normally closes the liquid discharge port 41 in the filler neck 100A which is disposed in an inclined manner. The valve body 51 includes a shaft 58 protruding from the liquid discharge port 41 to the interior of the fuel passage forming portion 20. The shaft 58 is involved in restriction by the valve body regulating mechanism 60 and open driving of the liquid discharge port 41, which will be described below. The opening/closing valve mechanism 50 includes a liquid discharge function portion 59 in addition to the valve body 51. When liquid is stored in the liquid discharge path 40P under the condition that the liquid discharge port 41 is closed by the valve body 51, the liquid discharge function portion 59 opens the valve body 51, as will be described below, so as to discharge the stored liquid. The valve body regulating mechanism 60 includes a first engaging portion 61, a second engaging portion 62, and a spring body 64 in order to regulate the movement of the valve body 51. FIG. 14 is an explanatory view illustrating constituent members of the opening/closing valve mechanism 50 and an assembling state thereof together with the valve body regulating mechanism 60. FIG. 15 is an explanatory front view illustrating the opening/closing valve mechanism 50 as viewed in a direction "A" in FIG. 14. In order to understand shapes of the members, schematic perspective views and front views of the members are illustrated in parallel in FIG. 14, respectively.

As illustrated in FIG. 14, the shaft 58 of the valve body 51 is formed by laminating an upper shaft 58a and an under shaft 58b, and the upper shaft 58a has a tip-lower face of a tapered shape. The valve body regulating mechanism 60 is incorporated in the shielding walls 40h facing each other, and pivots around an axis of the pivot support pin 66 at a joint portion between the first engaging portion 61 and the second engaging portion 62. That is, the valve body regulating mechanism 60 pivots around the pivot support pin 66, whereby the second engaging portion 62 is engaged with the shaft 58 of the valve body 51 as will be described below and the first engaging portion 61 is engaged with the engaging piece 13 (see FIG. 12) of the insertion-side opening/closing member 11. When the valve body regulating mechanism 60 is incorporated by the pivot support pin 66, the spring body 64 illustrated in FIG. 12 is also incorporated. The spring body 64 is incorporated around the axis of the pivot support pin 66, and the urging force of the spring body 64 is applied to the valve body regulating mechanism 60 through the first engaging portion 61, on the side where the first engaging portion 61 is engaged with the engaging piece 13 of the insertion-side opening/closing member 11, that is, the side where the second engaging portion 62 is engaged with the shaft 58 of the valve body 51. The valve body regulating mechanism 60 receiving the urging force of the spring body 64 in this manner includes an engaging notch 62c on the lower end side of the second engaging portion 62. The engaging notch 62c is engaged with the upper shaft 58a of the shaft 58 in the valve body 51 when the valve body regulating mechanism 60 pivots toward the side where the second engaging portion 62 is engaged with the shaft 58 of the valve body 51, and the valve body 51 is regulated to close the liquid discharge port 41 through this engagement. When the engaging notch 62c is engaged with the upper shaft 58a, as illustrated in FIG. 15, the engaging notch 62c does not interfere with the under shaft 58b of the shaft 58 and a regulation protrusion 59a of the liquid discharge function portion 59.

The liquid discharge function portion 59 includes a tubular body 59b having the regulation protrusion 59a protruding to the center and a float 59 fixed to the tubular body 59b. The float 59c is located in the liquid discharge path 40P (see FIG. 12) in a state where the liquid discharge function portion 59 is incorporated in the shielding walls 40h facing each other so as to pivot around the axis of the pivot support pin 59d. The float 59c is a float having a smaller specific gravity than the liquid (for example, water) due the closure of the liquid discharge port 41 with the valve body 51. The float 59c may be a float having the same specific gravity as the liquid (for example, water) stored in the liquid discharge path 40P, or the float 59c may be good as long as floating in the liquid (for example, water) stored in the liquid discharge path 40P.

(B2) Operational Effects of Opening/Closing Valve Mechanism 50

When the vehicle is in a stopped state, the valve body 51 of the opening/closing valve mechanism 50 receives the urging force of the bent leaf spring body 57 as illustrated in FIG. 12 to close the liquid discharge port 41. In the state of the vehicle is stopped, the filler port 104 is closed by the insertion-side opening/closing member 11 of the insertion-side opening/closing valve mechanism 10, and the engaging piece 13 of the insertion-side opening/closing member 11 is engaged with the first engaging portion 61 of the valve body regulating mechanism 60. Therefore, since the valve body regulating mechanism 60 does not pivot around the axis of the pivot support pin 66, the engagement between the engaging notch 62c of the second engaging portion 62 and the upper shaft 58a of the valve body 51 is released, and there is no regulation of the valve body 51 by the valve body regulating mechanism 60. Even when the vehicle is traveling from the stopped state, the valve body 51 of the opening/closing valve mechanism 50 keeps closing the liquid discharge port 41 by the urging force of the bent leaf spring body 57. The engagement between the engaging notch 62c of the second engaging portion 62 and the upper shaft 58a of the valve body 51 is released in the similar manner.

Figure 16:
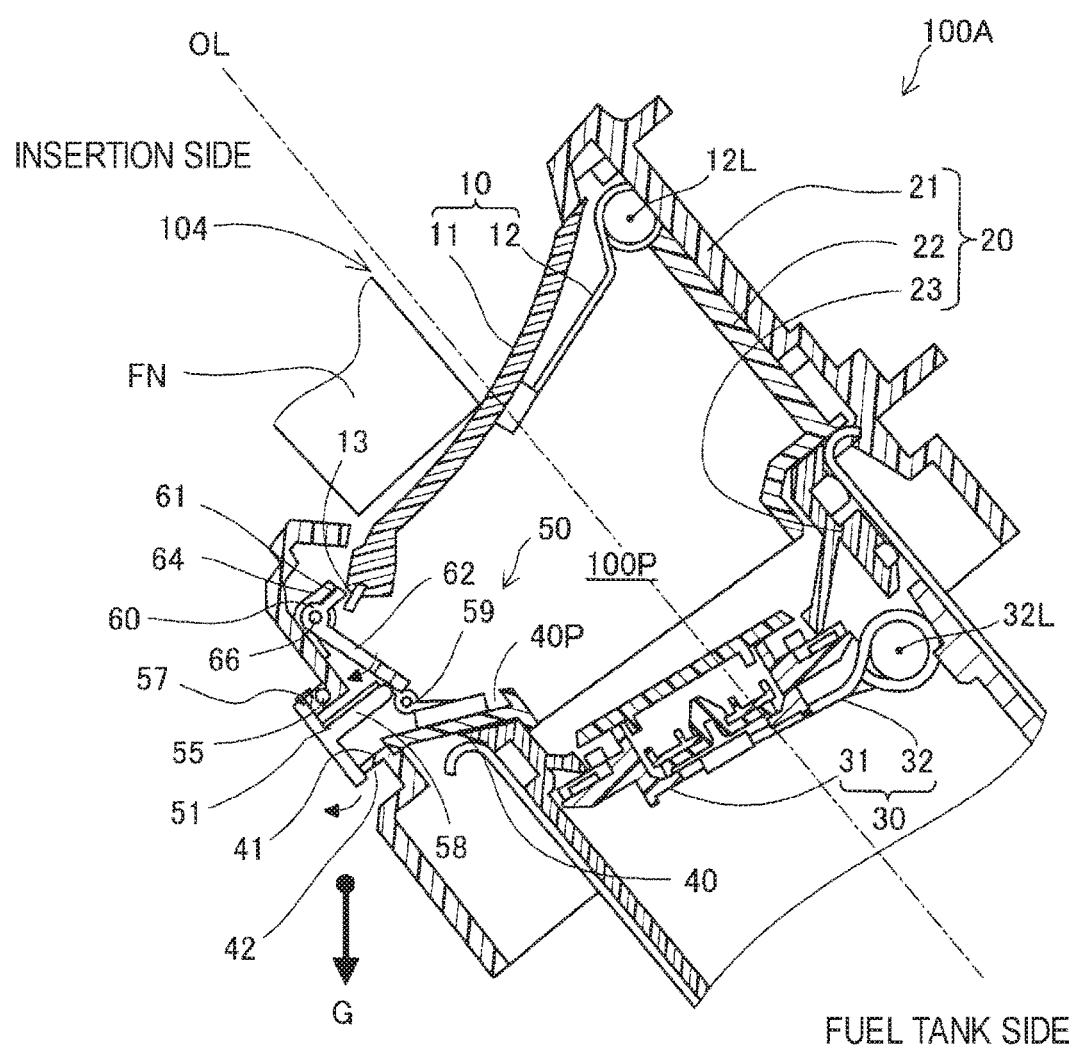
FIG. 16 is an explanatory view illustrating how the liquid discharge port is closed by the opening/closing valve mechanism and how the valve body is regulated by the valve body regulating mechanism before fueling.
Figure 17:
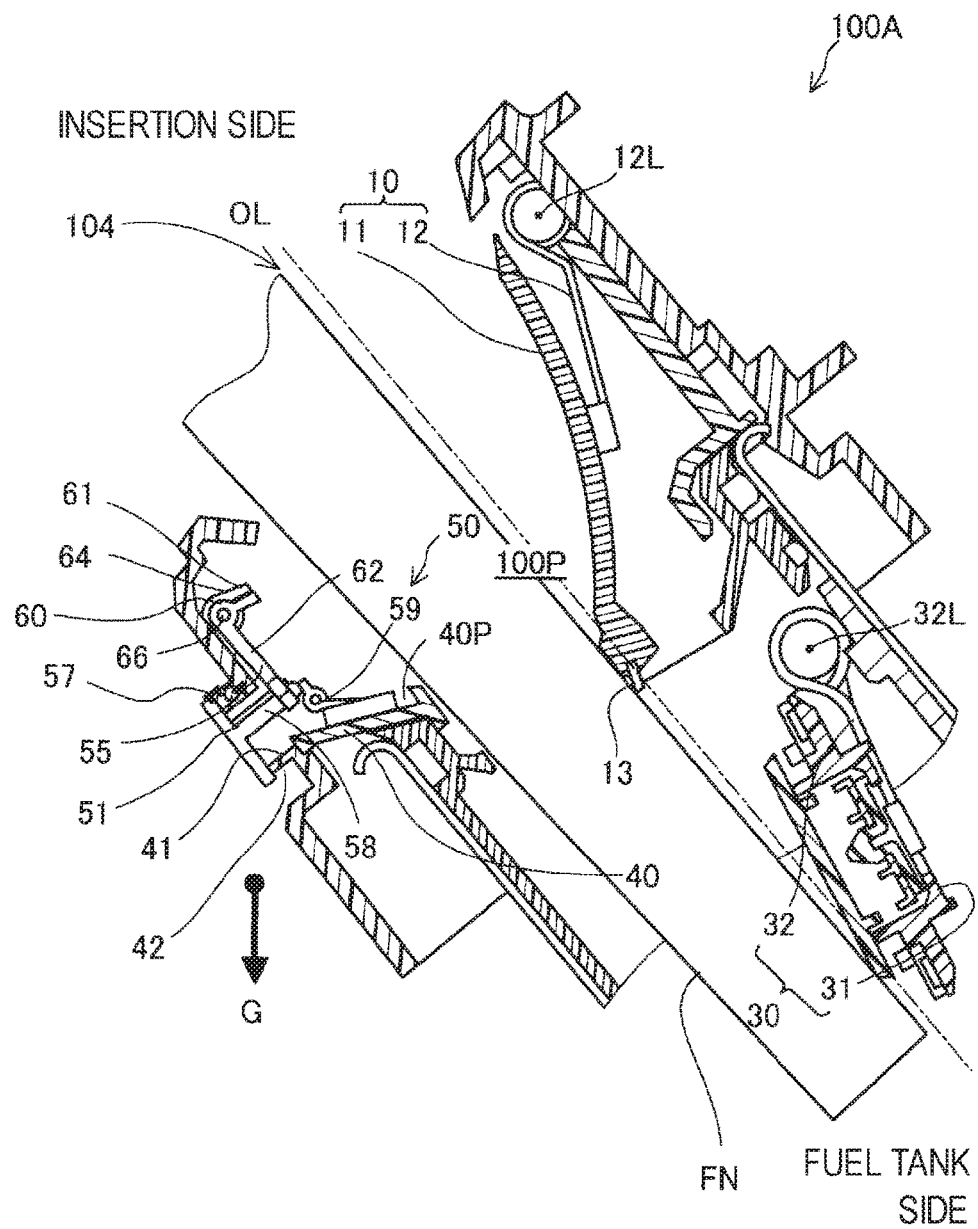
FIG. 17 is an explanatory view illustrating how the valve body is regulated by the valve body regulating mechanism during fueling.

FIG. 16 is an explanatory view illustrating how the liquid discharge port is closed by the opening/closing valve mechanism 50 and how the valve body is regulated by the valve body regulating mechanism 60 before fueling. FIG. 17 is an explanatory view illustrating how the valve body 51 is regulated by the valve body regulating mechanism 60 during fueling.

Since the vehicle is in the stopped state before the fueling, as described above, the opening/closing valve mechanism 50 closes the liquid discharge port 41 with the valve body 51, and as illustrated in FIG. 16, the fueling nozzle FN is inserted from the filler port 104. The insertion-side opening/closing member 11 of the insertion-side opening/closing valve mechanism 10 is driven to open the filler port 104 by the fueling nozzle FN, and the engagement between the engaging piece 13 of the insertion-side opening/closing member 11 and the first engaging portion 61 of the valve body regulating mechanism 60 is released. When the fueling nozzle FN is further inserted, as illustrated in FIG. 10, the insertion-side opening/closing member 11 of the insertion-side opening/closing valve mechanism 10 is further driven to open the filler port 104, and then the fuel tank-side opening/closing member 31 of the fuel tank-side opening/closing valve mechanism 30 is also driven to the opening side. Thus, when the insertion-side opening/closing member 11 opens the filler port 104, the engagement between the engaging piece 13 of the insertion-side opening/closing member 11 and the first engaging portion 61 of the valve body regulating mechanism 60 is released. Accordingly, the valve body regulating mechanism 60 receives the urging force of the spring body 64 and pivots around the axis of the pivot support pin 66 and causes the second engaging portion 62 to engage with the shaft 58 of the valve body 51 as illustrated in FIG. 17. Specifically, as illustrated in FIG. 15, the engaging notch 62c of the second engaging portion 62 is engaged with the upper shaft 58a of the shaft 58 in the valve body 51, and the movement of the valve body 51 around the axis of the pivot support pin 55 is regulated by the engagement and the closure state of the liquid discharge port 41 is maintained. That is, the valve body 51 is regulated to close the liquid discharge port 41 by the engagement between the second engaging portion 62 of the valve body regulating mechanism 60 and the shaft 58 of the valve body 51.

In the filler neck 100A functioning as the opening/closing apparatus for the fuel tank according to the second embodiment as described above, during the fuel supply, the valve body 51 is regulated to close the liquid discharge port 41. Therefore, even with the filler neck 100A of the second embodiment, the liquid discharge port 41 is closed during the fuel supply, and thus it is possible to suppress introduction of outside air from the liquid discharge path 40P into not only the internal region of the fuel passage forming portion 20 but also the fuel passage 100P. Moreover, the regulation of the valve body 51 to close the liquid discharge port in the filler neck 100A according to the second embodiment is due to the engagement of both members caused by the upper shaft 58a of the valve body 51 entering the engaging notch 62c of the second engaging portion 62, and thus the effectiveness of the closure of the liquid discharge port 41 due to the regulation of valve body 51 is increased. Therefore, according to the filler neck 100A of the second embodiment, it is possible to securely suppress the introduction of the outside air from the liquid discharge path 40P toward fuel passage 100P at the time of the fuel supply in which the insertion-side opening/closing member 11 opens the filler port 104.

Figure 18:
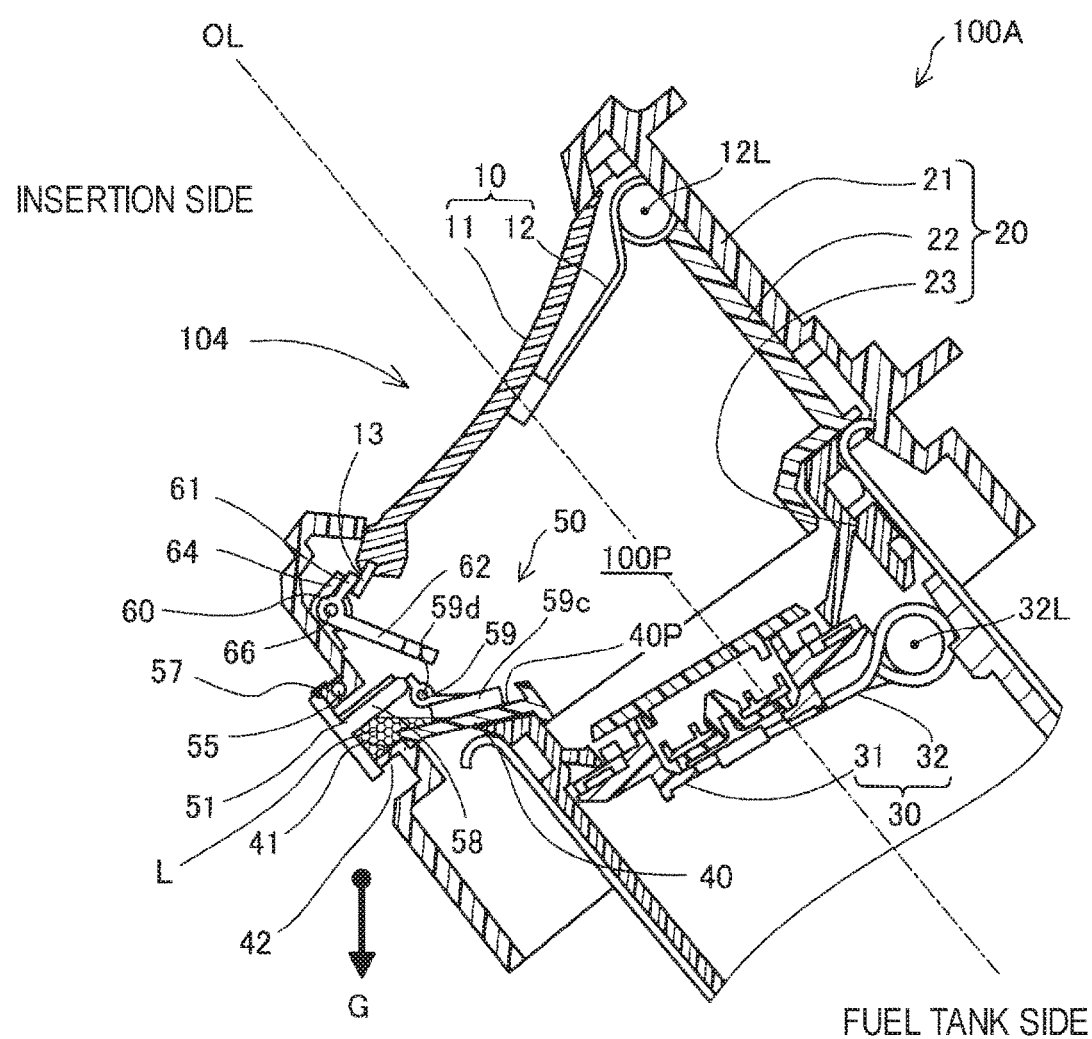
FIG. 18 is a first explanatory view for explaining the effect obtained by the filler neck of the second embodiment.
Figure 19:
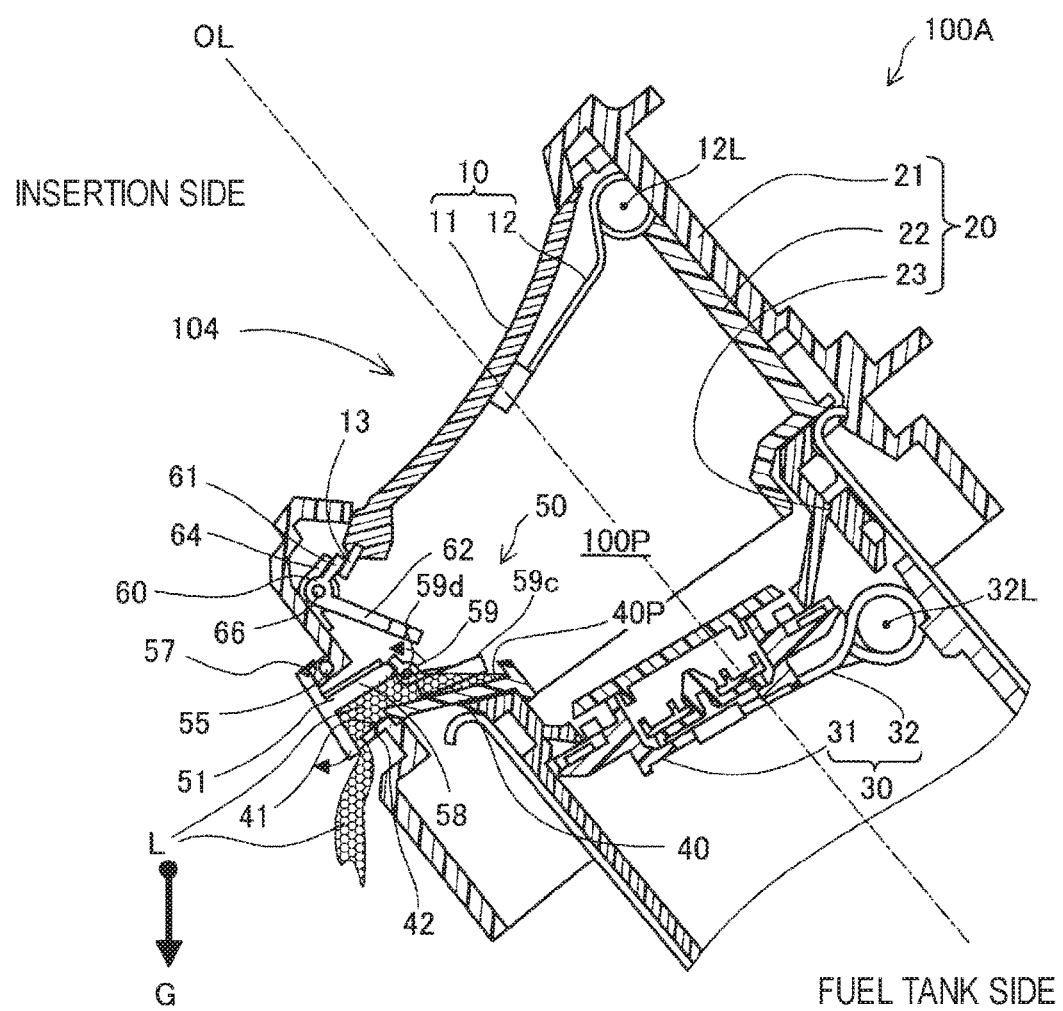
FIG. 19 is a second explanatory view for explaining the effect obtained by the filler neck of the second embodiment.

The filler neck 100A according to the second embodiment also has the following effects. FIG. 18 is a first explanatory view for explaining the effect obtained by the filler neck 100A of the second embodiment. FIG. 19 is a second explanatory view for explaining the effect obtained by the filler neck 100A of the second embodiment.

In a state where the opening/closing valve mechanism 50 is not regulated by the valve body regulating mechanism 60 and the liquid discharge port 41 is closed by the valve body 51, specifically, in a stopped state where the insertion-side opening/closing member 11 closes the filler port 104 or a traveling state, as illustrated in FIG. 18, liquid "L" such as rainwater may be stored in the liquid discharge path 40P. In the filler neck 100A of the second embodiment, the liquid discharge path 40P has the float 59c having a smaller specific gravity than the liquid "L" such as rainwater stored in the liquid discharge path 40P. In the filler neck 100A of the second embodiment, therefore, as illustrated in FIG. 19, the float 59c floats in the liquid "L" stored in the liquid discharge path 40P, and the liquid discharge function portion 59 pivots around the axis of the pivot support pin 59d by the buoyancy received by the float 59c from the liquid "L". The liquid discharge function portion 59 pushes the shaft 58 to open the liquid discharge port 41 by the rotation, and thus the valve body 51 is driven to open the liquid discharge port 41. As a result, according to the filler neck 100A of the second embodiment, under the condition that the insertion-side opening/closing member 11 closes the filler port 104, the liquid discharge port 41 is opened by the valve body 51, and thus the stored liquid can be discharged to the outside of the filler neck 100A from the liquid discharge path 40P.

Figure 20:
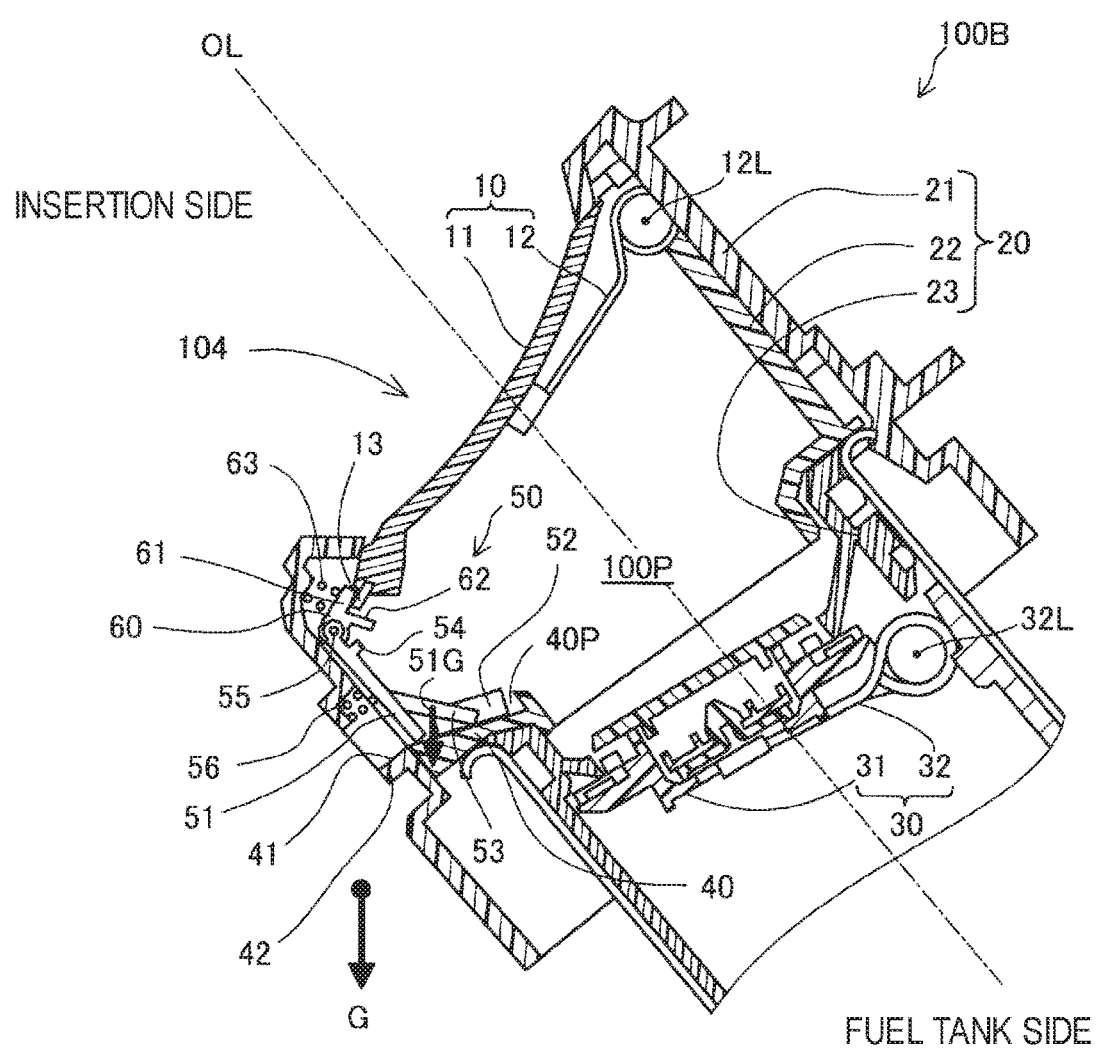
FIG. 20 is an explanatory view illustrating main portions of a filler neck according to a third embodiment when viewed from the cross section.
Figure 21:
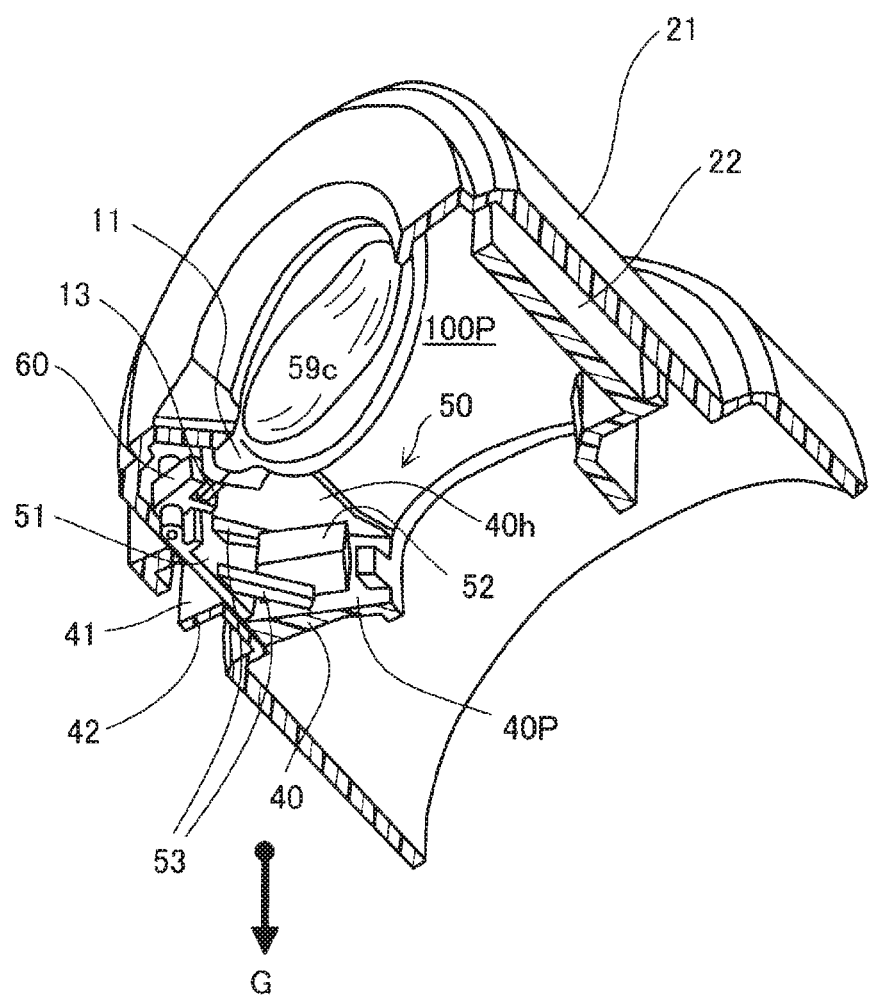
FIG. 21 is an explanatory perspective view illustrating the main portions of the filler neck when viewed from the cross section.

C. Third Embodiment (C1) Configuration and Operation of Respective Portions of Filler Neck FIG. 20 is an explanatory view illustrating main portions of a filler neck 100B according to a third embodiment when viewed from the cross section. FIG. 21 is an explanatory perspective view illustrating the main portions of the filler neck 100B when viewed from the cross section. The filler neck 100B according to the third embodiment is different from the above-described embodiments in that the opening/closing valve mechanism 50 and the valve body regulating mechanism 60 are provided separately, and then both the mechanisms are provided on the internal region of the fuel passage forming portion 20. Hereinafter, the filler neck 100B according to the third embodiment will be described in detail focusing on the different configurations.

As illustrated in FIG. 20, the filler neck 100B includes the fuel passage forming portion 20, the insertion-side opening/closing valve mechanism 10, the fuel tank-side opening/closing valve mechanism 30, and the liquid discharge path forming portion 40 similarly to the first embodiment, and an opening/closing valve mechanism 50 and a valve body regulating mechanism 60 are provided separately.

The opening/closing valve mechanism 50 includes a pair of support arms 53 protruding from the valve body 51, which opens and closes the liquid discharge port 41 of the liquid discharge path 40P, and a float 52. The float 52 is held between the support arms by being screwed. Similarly to the above-described float 59c in the second embodiment, the float 52 has a smaller specific gravity than a liquid (for example, water) stored in the liquid discharge path 40P.

Figure 22:
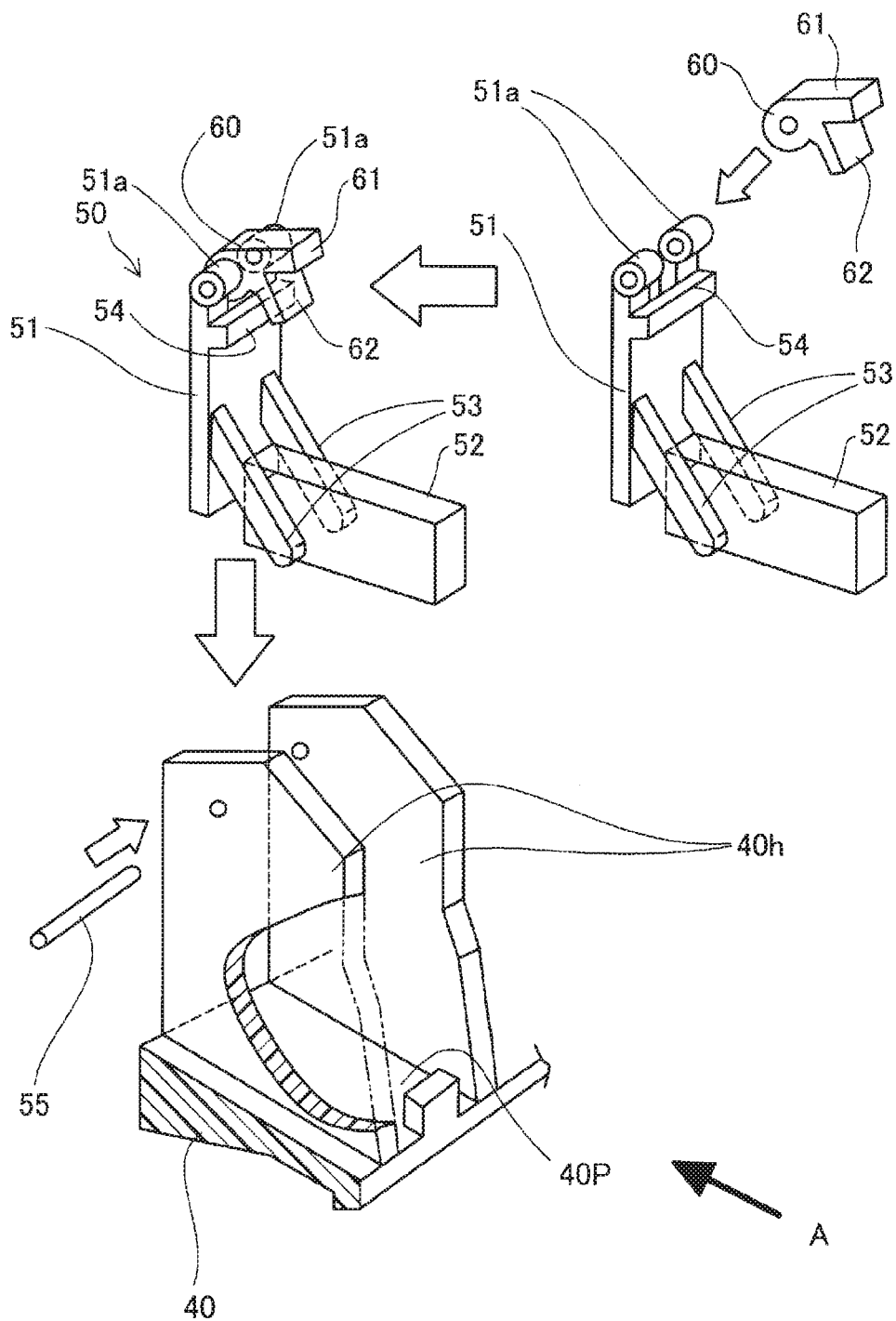
FIG. 22 is an explanatory view illustrating constituent members of the opening/closing valve mechanism and an assembling state thereof together with the valve body regulating mechanism.
Figure 23:
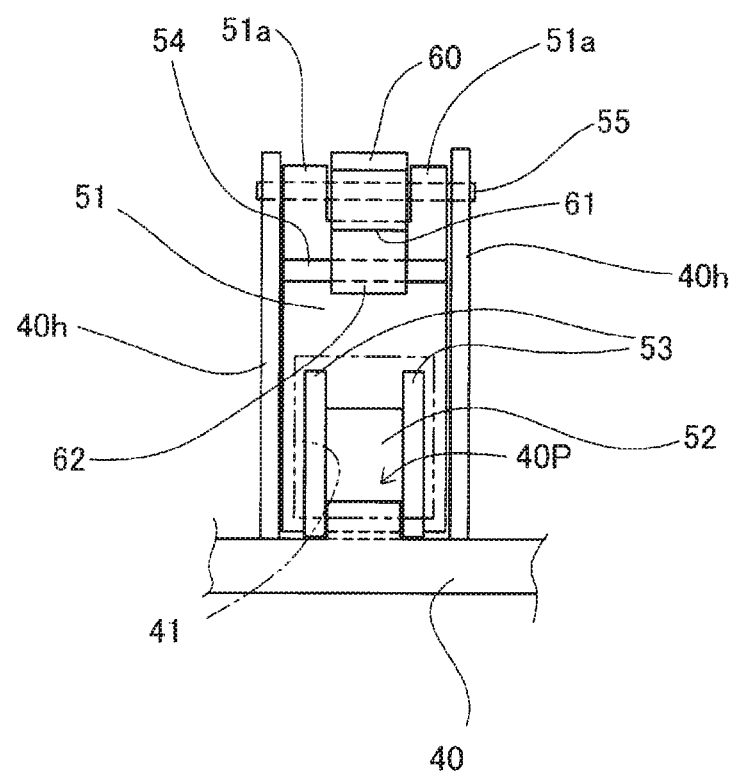
FIG. 23 is an explanatory front view illustrating the opening/closing valve mechanism as viewed in a direction "A" in FIG. 22.

The valve body regulating mechanism 60 includes the first engaging portion 61 and the second engaging portion 62 in order to regulate the movement of the valve body 51. FIG. 22 is an explanatory view illustrating constituent members of the opening/closing valve mechanism 50 and an assembling state thereof together with the valve body regulating mechanism 60. FIG. 23 is an explanatory front view illustrating the opening/closing valve mechanism 50 as viewed in a direction "A" in FIG. 22.

As illustrated in FIG. 22, the opening/closing valve mechanism 50 is assembled with the valve body 51 inserted between the shielding walls 40h in a state where the valve body regulating mechanism 60 is incorporated with a pair of pivot support arms 51a of the valve body 51. In this assembled state, the opening/closing valve mechanism 50 causes the support arms 53 to protrude to the liquid discharge path 40P from the valve body 51, so that the float 52 is positioned on the liquid discharge path 40P, as illustrated in FIG. 23. In addition, the valve body 51 is pivotably supported on the shielding wall 40h by the pivot support pin 55, and the valve body regulating mechanism 60 is pivotably supported on the shielding wall 40h by the pivot support pin 55 in the state of being incorporated with the pivot support arms 51a of the valve body 51. Therefore, the valve body 51 of the opening/closing valve mechanism 50 and the valve body regulating mechanism 60 are pivotable integrally around the pivot support pin 55. That is, the opening/closing valve mechanism 50 opens and closes the liquid discharge port 41 by the rotatable movement of the valve body 51 around the pivot support pin 55. The valve body regulating mechanism 60 causes the second engaging portion 62 to be engaged with an engaging protrusion 54 of the valve body 51 or causes the first engaging portion 61 to be engaged with the engaging piece 13 (see FIG. 20) of the insertion-side opening/closing member 11 by pivoting around the pivot support pin 55. When the valve body 51 and the valve body regulating mechanism 60 are incorporated, a spring 56 illustrated in FIG. 20 is incorporated in the partition wall 42 to urge the valve body 51 of the opening/closing valve mechanism 50 to be opened. Similarly, the spring 56 illustrated in FIG. 20 is incorporated in the outer body 21 of the fuel passage forming portion 20 to urge the first engaging portion 61 of the valve body regulating mechanism 60 toward the engaging piece 13 of the insertion-side opening/closing member 11

(C2) Operational Effects of Opening/Closing Valve Mechanism 50

When the vehicle is in a stopped state, as illustrated in FIG. 20, since the insertion-side opening/closing valve mechanism 10 closes the filler port 104 with the insertion-side opening/closing member 11 as in the first embodiment, the first engaging portion 61 of the valve body regulating mechanism 60 is engaged with the engaging piece 13, and the second engaging portion 62 is not engaged with the engaging projection portion 54 of the valve body 51. Therefore, no regulation of the valve body 51 by the valve body regulating mechanism 60 occurs, and the opening/closing valve mechanism 50 can pivot around the axis of the pivot support pin 55 separately from the valve body regulating mechanism 60. In this embodiment, since the force of the own weight 51G of the valve body 51 including the float 52 and the support arm 53 acting on the closing side of the valve body 51 exceeds the urging force of the spring 56 acting on the opening side of the valve body 51, the valve body 51 closes the liquid discharge port 41. In this state, when the vehicle is traveling from the stopped state, the inertial force accompanying the vehicle traveling acts on the valve body 51. When the inertial force is higher than the force acting on the closing side of the valve body 51, the valve body 51 pivots around the axis of the pivot support pin 55 and opens the liquid discharge port 41.

Figure 24:
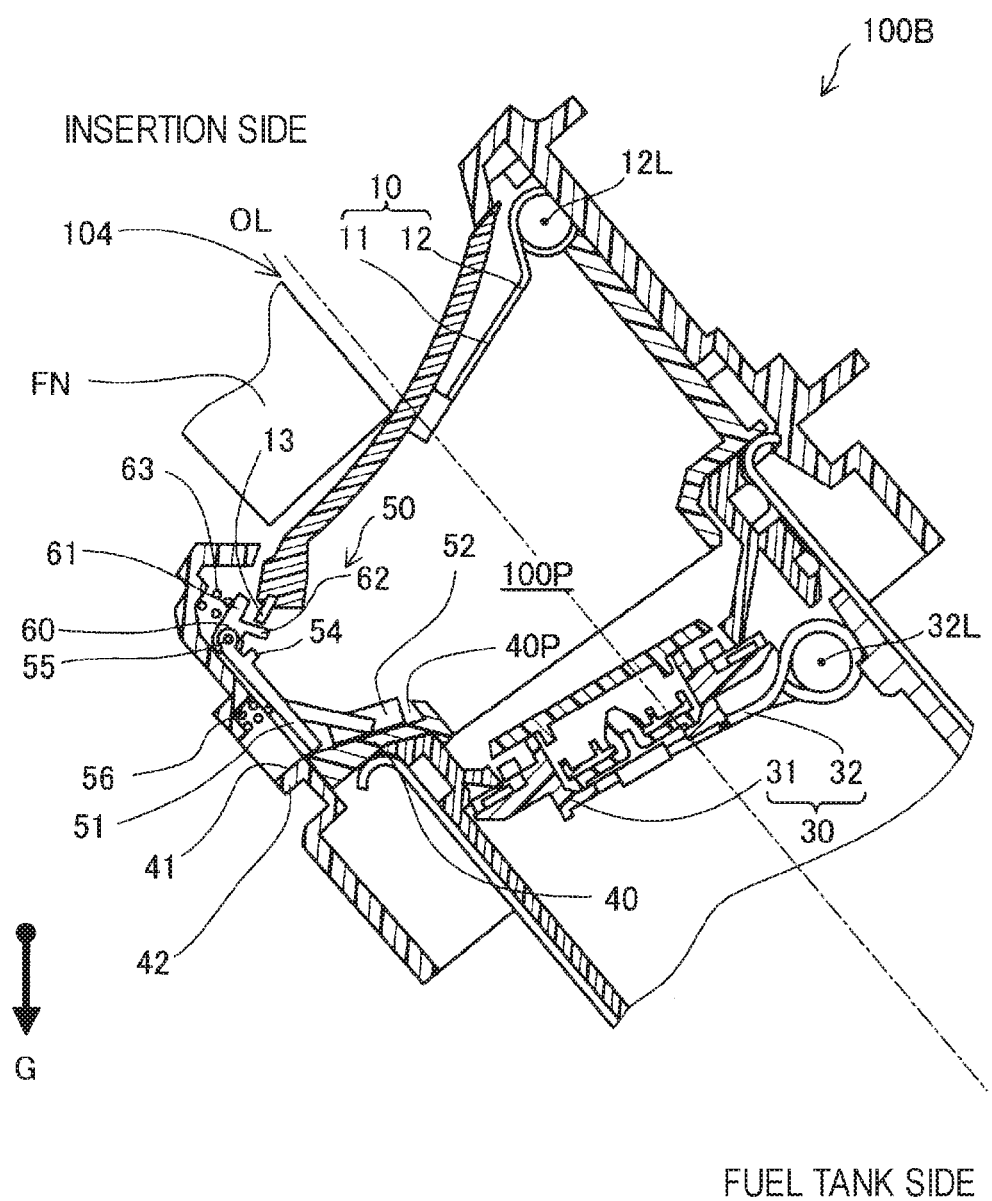
FIG. 24 is an explanatory view illustrating how the liquid discharge port is closed by the opening/closing valve mechanism and how the valve body is regulated by the valve body regulating mechanism before fueling.
Figure 25:
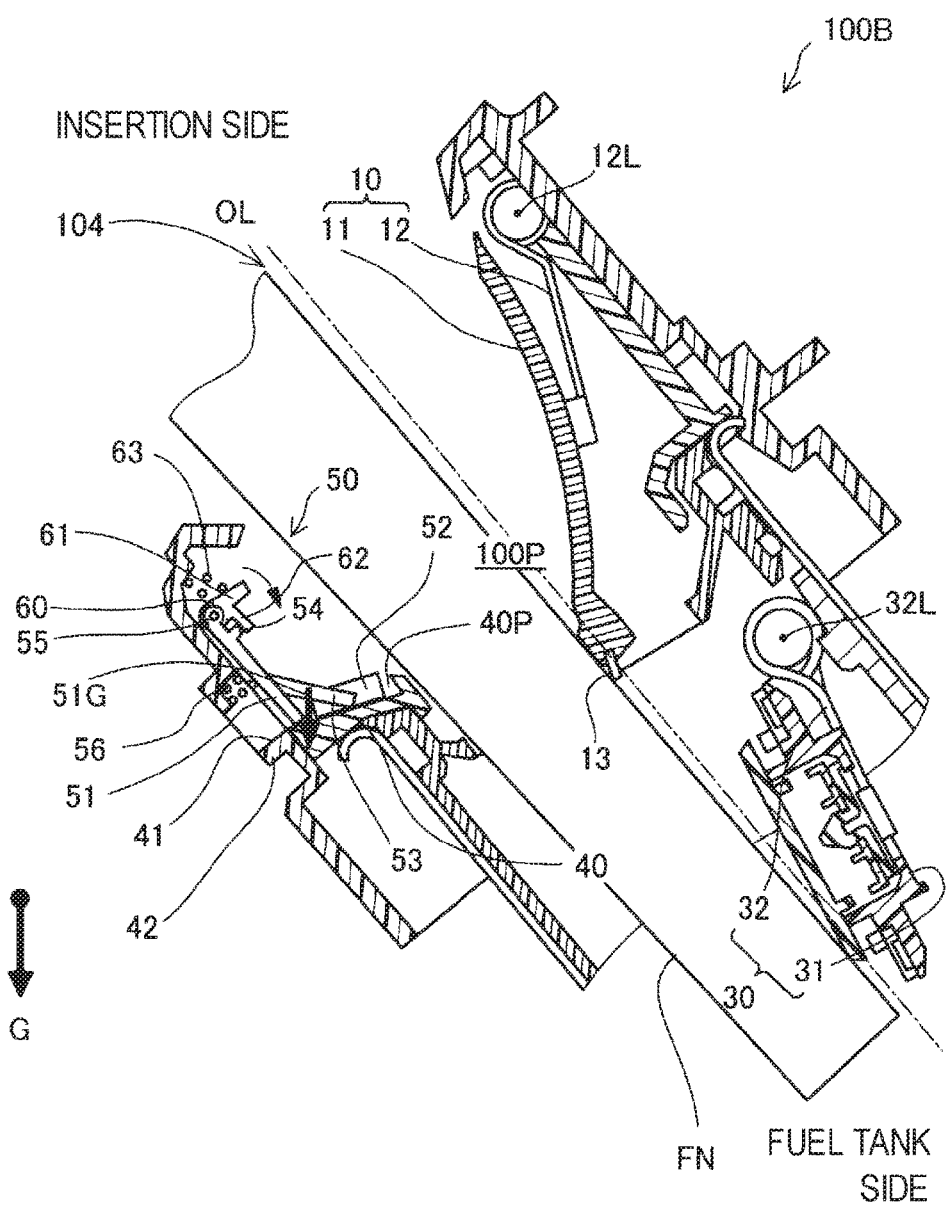
FIG. 25 is an explanatory view illustrating how the valve body is regulated by the valve body regulating mechanism during fueling.

FIG. 24 is an explanatory view illustrating how the liquid discharge port is closed by the opening/closing valve mechanism 50 and how the valve body is regulated by the valve body regulating mechanism 60 before fueling. FIG. 25 is an explanatory view illustrating how the valve body 51 is regulated by the valve body regulating mechanism 60 during fueling.

Since the vehicle is in the stopped state before the fueling, as described above, the opening/closing valve mechanism 50 closes the liquid discharge port 41 with the valve body 51, and as illustrated in FIG. 24, the fueling nozzle FN is inserted from the filler port 104. The insertion-side opening/closing member 11 of the insertion-side opening/closing valve mechanism 10 is driven to open the filler port 104 by the fueling nozzle FN, and the engaging piece 13 of the insertion-side opening/closing member 11 moves to be released from engagement between the first engaging portion 61 of the valve body regulating mechanism 60. When the fueling nozzle FN is further inserted, as illustrated in FIG. 25, the insertion-side opening/closing member 11 of the insertion-side opening/closing valve mechanism 10 is further driven to open the filler port 104, and then the fuel tank-side opening/closing member 31 of the fuel tank-side opening/closing valve mechanism 30 is also driven to the opening side. Thus, when the insertion-side opening/closing member 11 opens the filler port 104, the engagement between the engaging piece 13 of the insertion-side opening/closing member 11 and the first engaging portion 61 of the valve body regulating mechanism 60 is released. Accordingly, the valve body regulating mechanism 60 receives the urging force of the spring 63, pivots around the axis of the pivot support pin 55, and causes the second engaging portion 62 to engage with the engaging projection portion 54 of the valve body 51 as illustrated in FIG. 25. With this engagement, the movement of the valve body 51 around the axis of the pivot support pin 55 is regulated and the closure of the liquid discharge port 41 is maintained. That is, the valve body 51 is regulated to close the liquid discharge port 41 by the engagement between the second engaging portion 62 of the valve body regulating mechanism 60 and the engaging projection portion 54 of the valve body 51.

In the filler neck 100B functioning as the opening/closing apparatus for the fuel tank according to the third embodiment as described above, during the fuel supply, the valve body 51 is regulated to close the liquid discharge port 41. Therefore, even with the filler neck 100B of the third embodiment, the liquid discharge port 41 is closed during the fuel supply, and thus it is possible to suppress introduction of outside air from the liquid discharge path 40P into not only the internal region of the fuel passage forming portion 20 but also the fuel passage 100P. Moreover, the regulation of the valve body 51 to close the liquid discharge port in the filler neck 100B according to the third embodiment is due to the engagement in which the engaging projection portion 54 of the valve body 51 is pushed by the second engaging portion 62 of the valve body regulating mechanism 60, and thus the effectiveness of the closure of the liquid discharge port 41 due to the regulation of the valve body 51 is increased. Therefore, according to the filler neck 100B of the third embodiment, it is possible to securely suppress the introduction of the outside air from the liquid discharge path 40P toward the fuel passage 100P at the time of the fuel supply in which the insertion-side opening/closing member 11 opens the filler port 104.

Figure 26:
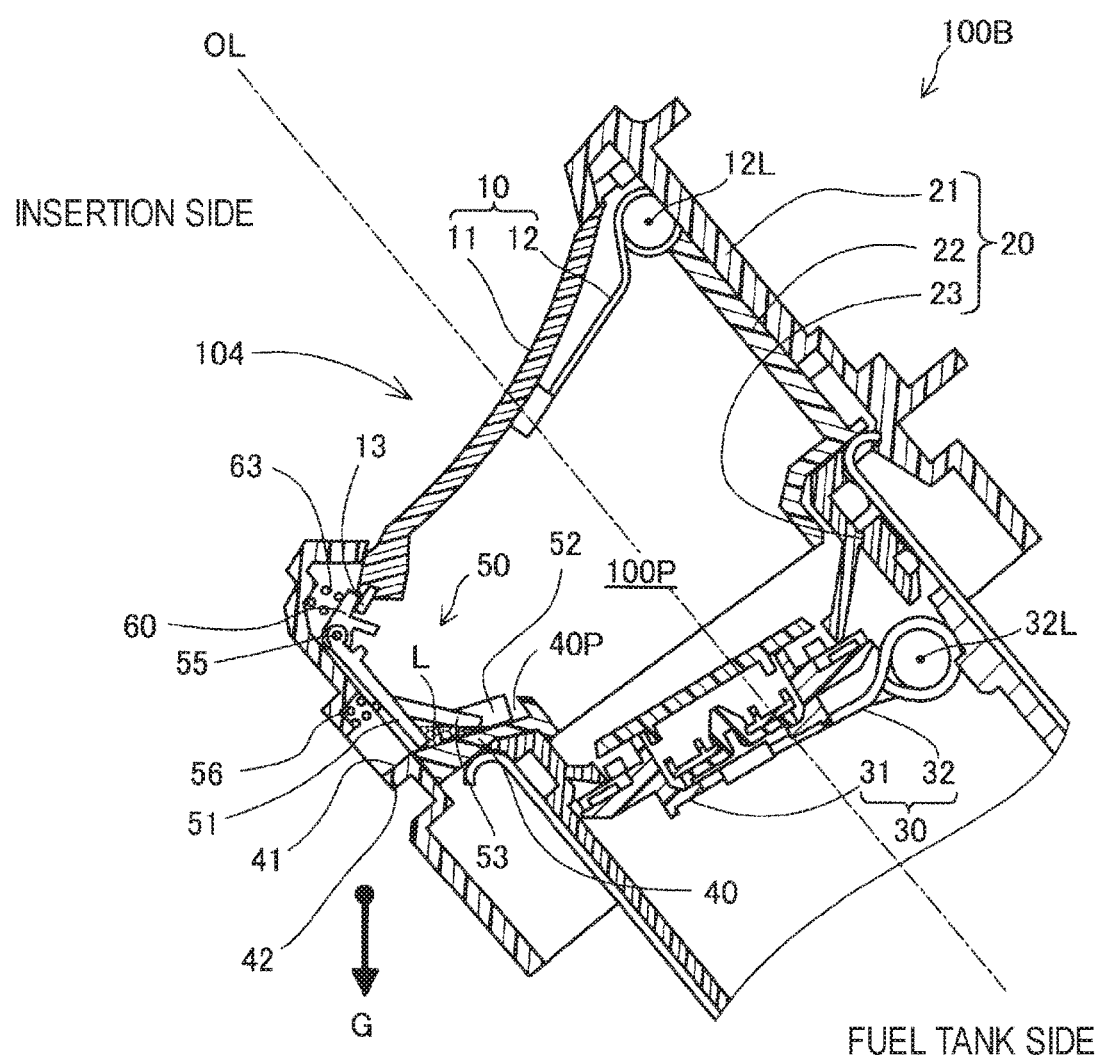
FIG. 26 is a first explanatory view for explaining the effect obtained by the filler neck of the third embodiment.
Figure 27:
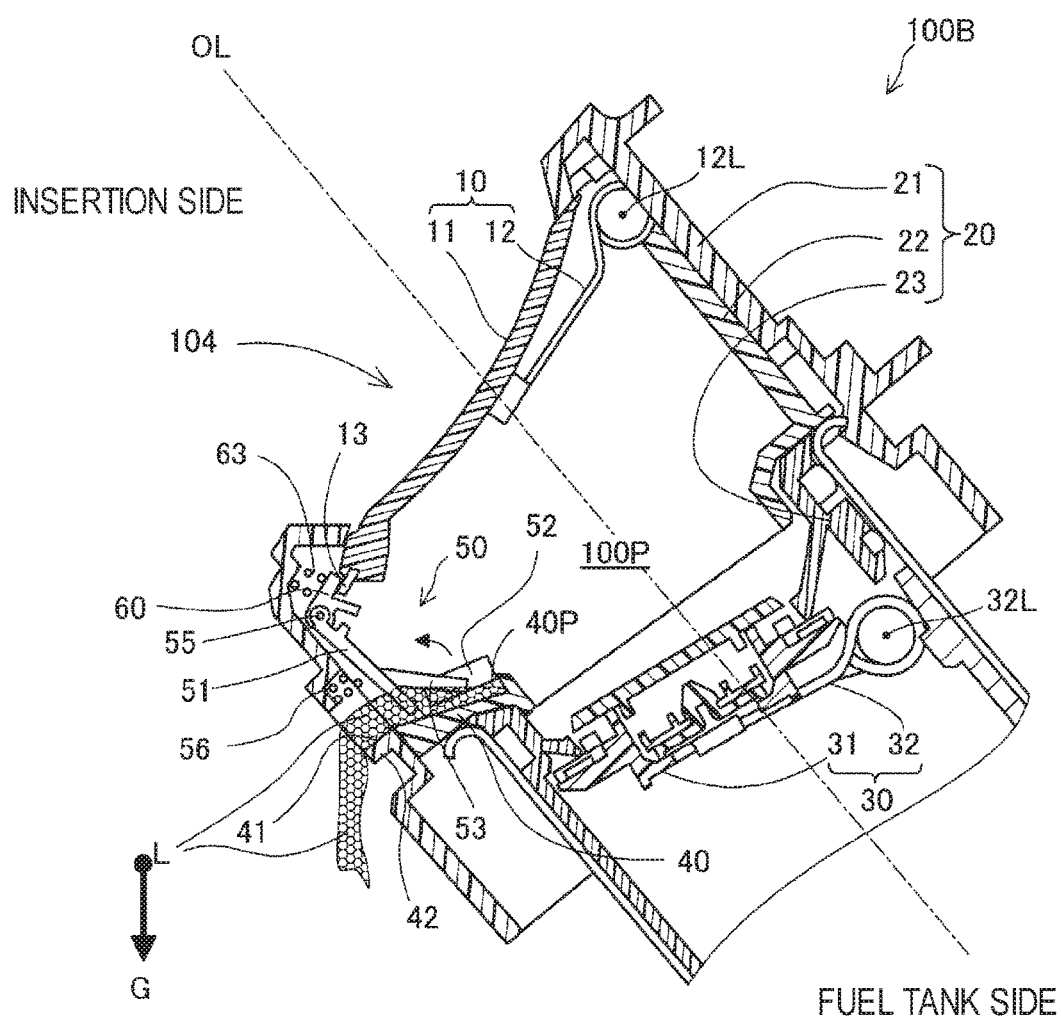
FIG. 27 is a second explanatory view for explaining the effect obtained by the filler neck of the third embodiment.

The filler neck 100B according to the third embodiment also has the following effects similarly to the second embodiment. FIG. 26 is a first explanatory view for explaining the effect obtained by the filler neck 100B of the third embodiment. FIG. 27 is a second explanatory view for explaining the effect obtained by the filler neck 100B of the third embodiment.

In a state where the opening/closing valve mechanism 50 is not regulated by the valve body regulating mechanism 60 and the liquid discharge port 41 is closed by the valve body 51, specifically, in a stopped state or a traveling state of a vehicle, as illustrated in FIG. 26, liquid "L" such as rainwater may be stored in the liquid discharge path 40P. In the filler neck 100B of the third embodiment, the liquid discharge path 40P has the float 52 having a smaller specific gravity than the liquid "L" such as rainwater stored in the liquid discharge path 40P. In the filler neck 100B of the third embodiment, therefore, as illustrated in FIG. 27, the float 52 floats in the liquid "L" stored in the liquid discharge path 40P, and the valve body 51 pivots around the axis of the pivot support pin 55 to close the liquid discharge port 41 by the buoyancy received by the float 52 from the liquid "L". As a result, according to the filler neck 100B of the third embodiment, under the condition that the insertion-side opening/closing member 11 closes the filler port 104, the liquid discharge port 41 is opened by the valve body 51, and thus the stored liquid can be discharged to the outside of the filler neck 100B from the liquid discharge path 40P.

The invention is not limited to any of the embodiments and the modifications described above but may be implemented by as diversity of other configurations without departing from the scope of the invention. For example, the technical features of any of the embodiments and modifications corresponding to the technical features of the respective aspects described in Summary may be replaced or combined appropriately, in order to solve part or all of the problems described above or in order to achieve part or all of the advantageous effects described above. Components other than those described in independent claims among components of any of the above embodiments and modifications are additional components and may be omitted appropriately.

As in the third embodiment, the float 52 may also be provided on the valve body 51 in the filler neck 100 according to the first embodiment. Further, the filler neck 100B having the float 52 according to the third embodiment may not have the float 52, similarly to the filler neck 100 according to the first embodiment.

In the filler necks 100 to 100B of the above-described embodiments, the valve body 51 is regulated to close the liquid discharge port 41 using own weight 51G of the valve body 51, the urging force of the spring such as the spring 63, or the buoyancy received by the float 59c and the float 52, but a resilient body such as rubber may be used.

According to one aspect of the invention, there is provided an opening/closing apparatus for a fuel tank of a vehicle, the opening/closing apparatus comprising: a fuel passage forming portion that forms a fuel passage configured to guide a supplied liquid fuel to the fuel tank; an insertion-side opening/closing valve mechanism that is disposed in the fuel passage forming portion, and that is configured to open and close a filler port of the fuel passage; a liquid discharge path that is configured to allow an internal region of the fuel passage forming portion to communicate with the outside of the opening/closing apparatus through a liquid discharge port formed in a portion of the fuel passage forming portion, the portion closer to the fuel tank than the insertion-side opening/closing valve mechanism; an opening/closing valve mechanism that is configured to open and close the liquid discharge port by a valve body disposed in the fuel passage forming portion; and a valve body regulating mechanism that is configured to regulate the valve body to close the liquid discharge port when the insertion-side opening/closing valve mechanism opens the filler port.

In the opening/closing apparatus for the fuel tank according to the above aspect, during the fuel supply that the insertion-side opening/closing valve mechanism opens, the valve body of the opening/closing valve mechanism is regulated to close the liquid discharge port and the closure of the liquid discharge port is maintained by the valve body. Therefore, according to the opening/closing apparatus for the fuel tank, the liquid discharge port is closed during the fuel supply, and thus it is possible to suppress introduction of outside air from the liquid discharge path into not only the internal region of the fuel passage forming portion but also the fuel passage.

The valve body regulating mechanism may include a first engaging portion that is configured to engage with an insertion-side opening/closing member which is included in the insertion-side opening/closing valve mechanism and which is configured to open and close the filler port, and that protrudes from the valve body of the opening/closing valve mechanism toward the insertion-side opening/closing member, and, when the insertion-side opening/closing member opens the filler port, the valve body regulating mechanism may be configured to exert an urging force to urge the valve body to close the liquid discharge port, to the first engaging portion which is disengaged from the insertion-side opening/closing member. With this configuration, it is possible to simplify the structure by sharing the constituent members with the valve body regulating mechanism and the opening/closing valve mechanism, and to suppress the introduction of the outside air toward the fuel passage while maintaining the closure of the liquid discharge port during the fuel supply.

The valve body regulating mechanism may include: a first engaging portion that is configured to engage with an insertion-side opening/closing member which is included in the insertion-side opening/closing valve mechanism and which is configured to open and close the filler port; and a second engaging portion that is configured to engage with the valve body, and, when the insertion-side opening/closing member opens the filler port, the valve body regulating mechanism may be configured to release engagement between the first engaging portion and the insertion-side opening/closing member to cause the second engaging portion to engage with the valve body, and may be configured to regulate the valve body to close the liquid discharge port. With this configuration, the effectiveness of the closure of the liquid discharge port due to the regulation of valve body is increased by the engagement of the second engaging portion and the valve body. Therefore, it is possible to securely suppress the introduction of the outside air from the liquid discharge path toward fuel passage at the time of the fuel supply in which the insertion-side opening/closing member opens the filler port.

The opening/closing valve mechanism may include a float floating in a liquid stored in the liquid discharge path when the liquid discharge port is closed by the valve body, the float provided in the liquid discharge path while being held by a support arm protruding from the valve body toward the liquid discharge path, and buoyancy received by the float from the liquid stored in the liquid discharge path may be exerted to the valve body to open the liquid discharge port. With this configuration, when the liquid discharge port is closed by the valve body and the liquid is stored in the liquid discharge path, the float is floated on the liquid. In this state, the valve body is driven to open the liquid discharge port by the buoyancy thereof, resulting in the following benefits. When the insertion-side opening/closing valve mechanism opens the filler port, the valve body regulating mechanism regulates the valve body to close the liquid discharge port. Therefore, when the vehicle is in a stopped state or a traveling state in the state where the insertion-side opening/closing member closes the filler port, the valve body regulating mechanism does not regulate the valve body to close the liquid discharge port, and the valve body can be driven to open the liquid discharge port. According to the opening/closing apparatus for the fuel tank, the buoyancy received by the float from the liquid stored in the liquid discharge path is exerted to the valve body to open the liquid discharge port in the stopped state where the insertion-side opening/closing member closes the filler port or a traveling state, the liquid discharge port is opened by the valve body, and thus the stored liquid can be discharged to the outside of the opening/closing apparatus from the liquid discharge path.

The present invention can be realized by various aspects other than the opening/closing apparatus for the fuel tank. For example, the invention can be realized in the form of a fueling apparatus having the opening/closing apparatus for the fuel tank, a vehicle with the opening/closing apparatus for the fuel tank mounted thereon, and a method of manufacturing the opening/closing apparatus for the fuel tank.

What is claimed is:

1. An opening/closing apparatus for a fuel tank of a vehicle, the opening/closing apparatus comprising:
    a fuel passage forming portion that forms a fuel passage configured to guide a supplied liquid fuel to the fuel tank;
    an insertion-side opening/closing valve that is disposed in the fuel passage forming portion, and that is configured to open and close a filler port of the fuel passage;
    a liquid discharge port formed in a portion of the fuel passage forming portion which is closer to the fuel tank than the insertion-side opening/closing valve is to the fuel tank;
    a liquid discharge path that is configured to allow an internal region of the fuel passage forming portion to communicate with the outside of the opening/closing apparatus through the liquid discharge port;
    a valve body disposed in the fuel passage forming portion;
    an opening/closing valve that is configured to open and close the liquid discharge port by the valve body disposed in the fuel passage forming portion; and
    a valve body regulator that is configured to regulate the valve body to close the liquid discharge port when the insertion-side opening/closing valve opens the filler port, wherein
    the valve body regulator includes a first engaging portion that is configured to engage with an insertion-side opening/closing member which is included in the insertion-side opening/closing valve and which is configured to open and close the filler port, and that protrudes from the valve body of the opening/closing valve toward the insertion-side opening/closing member, and, when the insertion-side opening/closing member opens the filler port, the valve body regulator is configured to exert an urging force to urge the valve body to close the liquid discharge port, to the first engaging portion which is disengaged from the insertion-side opening/closing member.

2. An opening/closing apparatus for a fuel tank of a vehicle, the opening/closing apparatus comprising:
    a fuel passage forming portion that forms a fuel passage configured to guide a supplied liquid fuel to the fuel tank;
    an insertion-side opening/closing valve that is disposed in the fuel passage forming portion, and that is configured to open and close a filler port of the fuel passage;
    a liquid discharge port formed in a portion of the fuel passage forming portion which is closer to the fuel tank than the insertion-side opening/closing valve is to the fuel tank;
    a liquid discharge path that is configured to allow an internal region of the fuel passage forming portion to communicate with the outside of the opening/closing apparatus through the liquid discharge port;
    a valve body disposed in the fuel passage forming portion;
    an opening/closing valve that is configured to open and close the liquid discharge port by the valve body disposed in the fuel passage forming portion; and
    a valve body regulator that is configured to regulate the valve body to close the liquid discharge port when the insertion-side opening/closing valve opens the filler port, wherein
    the valve body regulator includes: a first engaging portion that is configured to engage with an insertion-side opening/closing member which is included in the insertion-side opening/closing valve and which is configured to open and close the filler port; and a second engaging portion that is configured to engage with the valve body, and, when the insertion-side opening/closing member opens the filler port, the valve body regulator is configured to release engagement between the first engaging portion and the insertion-side opening/closing member to cause the second engaging portion to engage with the valve body, and is configured to regulate the valve body to close the liquid discharge port.

3. The opening/closing apparatus according to claim 2, wherein
    the opening/closing valve includes a float floating in a liquid stored in the liquid discharge path when the liquid discharge port is closed by the valve body, the float provided in the liquid discharge path while being held by a support arm protruding from the valve body toward the liquid discharge path, and buoyancy received by the float from the liquid stored in the liquid discharge path is exerted to the valve body to open the liquid discharge port.

* * * * *